US012731391B2

(12) United States Patent
Zhang et al.

(10) Patent No.: US 12,731,391 B2
(45) Date of Patent: Sep. 8, 2026

(54) IMAGE CLASSIFICATION METHOD, MODEL TRAINING METHOD, DEVICE, STORAGE MEDIUM, AND COMPUTER PROGRAM

(71) Applicant: Huawei Technologies Co., Ltd., Shenzhen (CN)

(72) Inventors: Yikang Zhang, Beijing (CN); Zhao Zhong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 18/400,070

(22) Filed: Dec. 29, 2023

(65) Prior Publication Data

US 2024/0135698 A1 Apr. 25, 2024
US 2024/0233358 A9 Jul. 11, 2024

Related U.S. Application Data

(63) Continuation of application No. PCT/CN2022/101605, filed on Jun. 27, 2022.

(30) Foreign Application Priority Data

Jun. 30, 2021 (CN) ......................... 202110735905.3

(51) Int. Cl.
*G06V 10/82* (2022.01)
*G06V 10/764* (2022.01)
*G06V 10/774* (2022.01)

(52) U.S. Cl.
CPC ............ *G06V 10/82* (2022.01); *G06V 10/764* (2022.01); *G06V 10/774* (2022.01)

(58) Field of Classification Search
None
See application file for complete search history.

(56) References Cited

U.S. PATENT DOCUMENTS 11,361,192 B2 * 6/2022 Peng ...................... G06N 3/084

FOREIGN PATENT DOCUMENTS

CN 108319968 A 7/2018
CN 108446388 A 8/2018
CN 111091532 A 5/2020

OTHER PUBLICATIONS

Yun Yang et al, "Two-Stage Selective Ensemble of CNN via Deep Tree Training for Medical Image Classification," IEEE Transactions on Cybernetics, vol. 52, No. 9, Mar. 11, 2021 (Mar. 11, 2021), pp. 9194-9207, Xp093184486, total 14 pages.

(Continued)

*Primary Examiner* — Dov Popovici
(74) *Attorney, Agent, or Firm* — Slater Matsil, LLP

(57) ABSTRACT

Embodiments of this application disclose an image classification method, a device and a storage medium, and belong to the field of image processing. In this method, a target image is processed by using a current neural network model, to obtain a current classification result. The current neural network model is a neural network model i corresponding to a largest probability in a selection result output by a neural network model a, and the selection result includes probabilities corresponding to p neural network models in m neural network models. A current integration result is determined based on the current classification result, and a category of the target image is determined based on the current integration result.

20 Claims, 12 Drawing Sheets

Process a to-be-classified target image by using a current neural network model, to obtain a current classification result output by the current neural network model — 701

Determine a current integration result based on the current classification result, where the current integration result includes an integrated probability that the target image belongs to each of a plurality of categories — 702

Determine a category of the target image based on the current integration result — 703

(56) References Cited

OTHER PUBLICATIONS

An-Chieh Cheng et al:"InstaNAS: Instance-Aware Neural Architecture Search." Jun. 2, 2020. total 8 pages.

* cited by examiner

CONT. FROM FIG. 3B

FIG. 3C

IMAGE CLASSIFICATION METHOD, MODEL TRAINING METHOD, DEVICE, STORAGE MEDIUM, AND COMPUTER PROGRAM

CROSS-REFERENCE TO RELATED APPLICATIONS

This application is a continuation of International Application No. PCT/CN2022/101605, filed on Jun. 27, 2022, which claims priority to Chinese Patent Application No. 202110735905.3, filed on Jun. 30, 2021. The disclosures of the aforementioned applications are hereby incorporated by reference in their entireties.

TECHNICAL FIELD

Embodiments of this application relate to the field of image processing, and in particular, to an image classification method, a model training method, a device, a storage medium, and a computer program.

BACKGROUND

In recent years, deep learning has been widely used in the field of image classification. As an important branch of deep learning, a neural network has a strong fitting capability, so that accuracy of a classification result is greatly improved after the neural network is applied to an image classification task.

A conventional technology proposes an image classification method in which a plurality of neural network models may be trained in advance. During image classification, one classification result is determined by using each of the plurality of neural network models, to obtain a plurality of classification results. Then, the plurality of classification results are integrated for processing, to obtain a final classification result.

However, in the foregoing method, the classification result of each neural network model needs to be obtained. Therefore, a calculation amount is multiplied, and image classification efficiency is greatly reduced.

SUMMARY

Embodiments of this application provide an image classification method, a model training method, a device, a storage medium, and a computer program, to resolve a problem of low image classification efficiency in a conventional technology. The technical solutions are as follows.

According to a first aspect, an image classification method is provided. In the method, a to-be-classified target image is processed by using a current neural network model, to obtain a current classification result output by the current neural network model. The current classification result includes a probability that the target image belongs to each of a plurality of categories, the current neural network model is a neural network model i corresponding to a largest probability in a selection result output by a neural network model a, the selection result output by the neural network model a includes probabilities corresponding to p neural network models in m trained neural network models, the p neural network models are neural network models that are after the neural network model a and that are allowed to be used to process the target image, the p neural network models include the neural network model i, the m neural network models include the neural network model a, m is an integer greater than 1, p is an integer greater than or equal to 1, and p is less than m. A current integration result is determined based on the current classification result, where the current integration result includes an integrated probability that the target image belongs to each of the plurality of categories. A category of the target image is determined based on the current integration result.

In this embodiment of this application, in the m trained neural network models, one or more neural network models that are after the neural network model a and that are allowed to be used to process the target image may be included, and the one or more neural network models are other neural network models that are after the neural network model a and that are used to process the target image. That is, p is an integer greater than or equal to 1, and p is less than m.

Because the selection result output by the neural network model a includes the probability corresponding to the neural network model, in the m trained neural network models, that is after the neural network model a and that is allowed to be used to process the target image, and the current neural network model is the neural network model i corresponding to the largest probability in the selection result output by the neural network model a, it may be determined that the classification result output by the neural network model a does not meet a condition. Therefore, the neural network model i corresponding to the largest probability in the selection result output by the neural network model a is determined as the current neural network model, and the target image is processed by using the current neural network model.

In other words, in this embodiment of this application, the target image is processed in a cyclic iteration manner, and when a classification result obtained in a previous cycle does not meet a condition, a neural network model that is used to process the target image next time may be determined by using a selection result obtained in the previous cycle. Because classification precision of the neural network model used to process the target image next time is higher than classification precision of a neural network model used to process the target image previous time, after cyclic iteration processing is performed in this manner, image classification precision can be improved. In other words, in this embodiment of this application, based on a property of the target image, a part of neural network models can be dynamically selected from the m neural network models to perform image classification, and image classification does not need to be performed on each neural network model, thereby reducing an operation amount. In addition, because only the part of neural network models are selected, only parameters of the part of neural network models need to be read into a memory, and parameters of all neural network models do not need to be read into the memory, thereby avoiding a problem of time-consuming memory reading.

In some embodiments, the current neural network model may further output a current selection result, the current selection result includes probabilities corresponding to d neural network models in the m neural network models, the d neural network models are neural network models that are after the neural network model i and that are allowed to be used to process the target image, d is an integer greater than or equal to 1, and d is less than m. In other words, in this embodiment of this application, the target image may be processed by using the current neural network model in two implementations. The following describes the two implementations.

In a first implementation, the target image is input into the current neural network model, to obtain the current classification result and the current selection result that are output by the current neural network model.

To be specific, in the first implementation, any neural network model in the m neural network networks is used as the current neural network model. After the target image is input into the current neural network model, the current neural network model can not only output the current classification result about the target image, but also determine a probability, namely, the current selection result, corresponding to a neural network model that is after the current neural network model and that is allowed to be used to process the target image.

A large probability corresponding to the neural network model that is after the current neural network model and that is allowed to be used to process the target image indicates high classification precision of the neural network model for the target image. In addition, usually, classification precision of the neural network model i for the target image is higher than classification precision of the neural network model a for the target image.

In a second implementation, the target image and a current iteration quantity are input into the current neural network model, and the target image is processed by using the current neural network model.

There are two cases in the second implementation, and the two cases are separately described below.

In a first case, the target image and the current iteration quantity are input into the current neural network model, to obtain the current classification result output by the current neural network model.

To be specific, in the first case, the current iteration quantity of the input current neural network model is less than an iteration quantity threshold, and a difference between the current iteration quantity and the iteration quantity threshold is 1. In this way, after the target image is processed by using the current neural network model, the current iteration quantity already reaches the quantity threshold, and no subsequent iteration needs to be performed. Therefore, the current neural network model may output only the current classification result.

In a second case, the target image and the current iteration quantity are input into the current neural network model, to obtain the current classification result and the current selection result that are output by the current neural network model.

To be specific, in the second case, the current iteration quantity of the input current neural network model is less than an iteration quantity threshold, and a difference between the current iteration quantity and the iteration quantity threshold is greater than 1. In this way, after the target image is processed by using the current neural network model, the current iteration quantity does not reach the quantity threshold, and the iteration may further need to be performed subsequently. Therefore, the current neural network model needs to output the current classification result and the current selection result.

In some embodiments, an average value of probabilities of corresponding categories in a plurality of classification results may be determined as a probability of a corresponding category in the current integration result, where the plurality of classification results include the classification result output by the neural network model a and a classification result output by the neural network model i. Alternatively, the current classification result is directly determined as the current integration result.

To be specific, a probability of a first category in the current integration result includes an average value of probabilities of the first category in the plurality of classification results, where the plurality of classification results include the classification result output by the neural network model a and the classification result output by the neural network model i. Alternatively, a probability of a first category in the current integration result includes a probability of the first category in the classification result output by the neural network model i. The first category is one of the plurality of categories.

Based on the foregoing description, there are two implementations for processing the target image by using the current neural network model. In different implementations, different categories of the target image are determined based on the current integration result. Therefore, the following also uses two implementations for description.

In a first implementation, when the target image is processed by using the current neural network model based on the first implementation, that the category of the target image is determined based on the current integration result includes: If the current integration result meets a first convergence condition or the current neural network model meets a second convergence condition, a category corresponding to a largest probability in the current integration result is determined as the category of the target image. If the current integration result does not meet the first convergence condition and the current neural network model does not meet the second convergence condition, the neural network model corresponding to the largest probability in the current selection result is used as the current neural network model, and the target image is reprocessed by using the foregoing method.

In the first implementation, each neural network model outputs a classification result and a selection result. Therefore, after the current integration result is determined based on the current classification result output by the current neural network model, whether the current integration result meets the first convergence condition needs to be determined, and whether the current neural network model meets the second convergence condition needs to be determined. If the current integration result meets the first convergence condition or the current neural network model meets the second convergence condition, it indicates that reliability of the current integration result is high. The category corresponding to the largest probability in the current integration result is determined as the category of the target image. If the current integration result does not meet the first convergence condition and the current neural network model does not meet the second convergence condition, it indicates that reliability of the current integration result is not high, the neural network model corresponding to the largest probability in the current selection result is used as the current neural network model, and the target image is reprocessed by using the foregoing method.

In an example, that the current integration result meets a first convergence condition includes: Confidence of the current integration result is greater than a confidence threshold. That the current neural network model meets a second convergence condition includes: An iteration quantity of the current neural network model is greater than or equal to the iteration quantity threshold. Certainly, that the current integration result meets a first convergence condition may further include another condition. Similarly, that the current neural network model meets a second convergence condition may also include another condition.

When that the current integration result meets a first convergence condition includes that the confidence of the current integration result is greater than the confidence threshold, after the current integration result is determined based on the current classification result, the confidence of the current integration result may be further determined. An implementation process of determining the confidence of the current integration result includes: determining the largest probability in the current integration result as the confidence of the current integration result; or inputting the target image and the current integration result into a confidence network model, to obtain the confidence that is output by the confidence network model and that is of the current integration result.

In a second implementation, when the target image is processed by using the current neural network model based on the foregoing second implementation, an implementation process of determining the category of the target image based on the current integration result includes two cases. The following separately describes the two cases, and the two cases correspond to the two cases in the foregoing second implementation.

In a first case, the category corresponding to the largest probability in the current integration result is determined as the category of the target image.

In the first case, after the target image is processed by using the current neural network model, the current iteration quantity already reaches the iteration quantity threshold. This indicates that reliability of the current integration result is high. Therefore, the category corresponding to the largest probability in the current integration result may be directly determined as the category of the target image, and whether the current integration result meets the first convergence condition does not need to be determined.

In a second case, if the current integration result meets the first convergence condition, the category corresponding to the largest probability in the current integration result is determined as the category of the target image. If the current integration result does not meet the first convergence condition, the neural network model corresponding to the largest probability in the current selection result is used as the current neural network model, and the target image is reprocessed by using the foregoing method.

In the second case, after the target image is processed by using the current neural network model, the current iteration quantity does not reach the iteration quantity threshold. Reliability of the current integration result is uncertain. Therefore, it needs to be determined whether the current integration result meets the first convergence condition. If the current integration result meets the first convergence condition, it is determined that the reliability of the current integration result is high. Therefore, the category corresponding to the largest probability in the current integration result is determined as the category of the target image. If the current integration result does not meet the first convergence condition, it is determined that the reliability of the current integration result is low. Therefore, the neural network model corresponding to the largest probability in the current selection result is used as the current neural network model, and the target image is reprocessed by using the foregoing method.

Optionally, before the target image is classified by using the m neural network models, m to-be-trained neural network models may be further trained, to obtain the m neural network models. To be specific, n sample images and n sample labels are obtained, where the n sample labels one-to-one correspond to the n sample images. A gradient of each parameter of each of the m to-be-trained neural network models is determined based on the n sample images and the n sample labels. The m to-be-trained neural network models are updated based on the gradient of each parameter of the m to-be-trained neural network models, to obtain the m trained neural network models.

For each of the m to-be-trained neural network models, methods for determining gradients of parameters of each to-be-trained neural network model are the same. The following uses a to-be-trained neural network model k of the m to-be-trained neural network models as an example for description.

In some embodiments, a gradient of each parameter of the to-be-trained neural network model k may be determined based on the following operations: determining, based on the n sample images and the n sample labels, a training function value corresponding to the to-be-trained neural network model k; and determining the gradient of each parameter of the to-be-trained neural network model k based on the training function value corresponding to the to-be-trained neural network model k.

Based on the foregoing description, training function values corresponding to the to-be-trained neural network model k include n classification function values, n weight function values, n label function values, n classification loss function values, and n selection weight function values. The n classification function values one-to-one correspond to the n sample images, the n weight function values one-to-one correspond to the n sample images, the n label function values one-to-one correspond to the n sample images, the n classification loss function values one-to-one correspond to the n sample images, and the n selection weight function values also one-to-one correspond to the n sample images. The following separately describes a process of determining the plurality of function values.

Process of Determining the n Classification Function Values

Because manners of determining a classification function value corresponding to each sample image are the same, one sample image may be selected from the n sample images, and a classification function value corresponding to the selected sample image is determined based on the following operations, until the classification function value corresponding to each sample image is determined: inputting the selected sample image into the to-be-trained neural network model k, to obtain a classification result output by the to-be-trained neural network model k; and determining, based on a sample label corresponding to the selected sample image and the classification result output by the to-be-trained neural network model k, the classification function value corresponding to the selected sample image.

The classification function value may be a cross-entropy loss function value, or is also referred to as a task correlation function.

Process of Determining the n Weight Function Values

In this embodiment of this application, the n weight function values may be implemented based on a rule, or may be implemented based on meta-learning. The following separately describes the two implementations.

In a first implementation, the n weight function values are implemented based on the rule. After the n weight function values are determined by using this implementation, when a to-be-trained neural network model that is before the to-be-trained neural network model k and that is allowed to be used to process an image determines that a to-be-trained neural network model used to process the image next time is the to-be-trained neural network model k, the to-be-trained neural network model k has a high weight function value on the image.

In the first implementation, the n weight function values may be determined based on the n sample images and the n sample labels by using the following steps (11) to (13).

(n) Determine, by using b to-be-trained neural network models, a standard probability, of each of the n sample images, that each oft to-be-trained neural network models is used to process, to obtain n*t standard probabilities, where t=m−b, the b to-be-trained neural network models are models, in the m to-be-trained neural network models, that are before the to-be-trained neural network model k and that are allowed to be used to process the n sample images, and the t to-be-trained neural network models include the to-be-trained neural network model k, and a model, in the m to-be-trained neural network models, that is after the to-be-trained neural network model k and that is allowed to be used to process the n sample images.

In some embodiments, an average probability, of each of the n sample images, that each of the t to-be-trained neural network models is used to process may be determined by using the b to-be-trained neural network models, to obtain n*t average probabilities. Average probabilities that are in the n*t average probabilities and that correspond to a same to-be-trained neural network model in the t to-be-trained neural network models are divided into a probability set, to obtain t probability sets. Standardization processing is performed on the n*t average probabilities based on the n*t average probabilities and the t probability sets, to obtain the n*t standard probabilities.

Manners of determining, by using the b to-be-trained neural network models, the average probability, of each of the n sample images, that each of the t to-be-trained neural network models is used to process are the same. Therefore, one sample image is selected from the n sample images, one to-be-trained neural network model is selected from the t to-be-trained neural network models, and the average probability, of the selected sample image, that the selected to-be-trained neural network model is used to process is determined by using the b to-be-trained neural network models and based on the following operations, until the n*t average probabilities are determined: determining, by using each of the b to-be-trained neural network models, a probability, of the selected sample image, that the selected to-be-trained neural network model is used to process, to obtain b probabilities; and determining an average value of the b probabilities, to obtain the average probability, of the selected sample image, that the selected to-be-trained neural network model is used to process.

In an example, for each of the b to-be-trained neural network models, the selected sample image may be input into the to-be-trained neural network model, to obtain a selection result output by the to-be-trained neural network model. The selection result includes a probability, of the selected sample image, that the selected to-be-trained neural network model is used to process, that is, a probability that a next neural network model that classifies the selected sample image is the selected to-be-trained neural network model. In this way, for each of the b to-be-trained neural network models, the probability, of the selected sample image, that the selected to-be-trained neural network model is used to process can be obtained, to obtain the b probabilities. The average value of the b probabilities may be determined, and the average value of the b probabilities is determined as the average probability, of the selected sample image, that the selected to-be-trained neural network model is used to process.

Manners of performing standardization processing on each average probability in each probability set in the t probability sets are the same. Therefore, a probability set may be selected from the t probability sets, and standardization processing is performed on each average probability in the selected probability set based on the following operations, until the n*t standard probabilities are determined: determining a mean value and a standard deviation of average probabilities in the selected probability set; and determining, based on the average probabilities in the selected probability set, the average value, and the standard deviation, a standard probability corresponding to each average probability in the selected probability set.

(12) Determine, based on the n*t standard probabilities, a first weight corresponding to each of the n sample images.

In some embodiments, the first weight corresponding to each of the n sample images may be determined by using the following steps (a) to (g).

(a) Form a standard probability set by using the n*t standard probabilities, and determine a relative probability value corresponding to each standard probability in the standard probability set.

In some embodiments, a standard probability is selected from the standard probability set, and a relative probability value corresponding to the selected standard probability is determined based on the following operations, until a relative probability value corresponding to each standard probability is determined: determining, from other standard probabilities other than the selected standard probability in the standard probability set, a plurality of standard probabilities corresponding to a same sample image as the selected standard probability; determining a largest standard probability in the plurality of standard probabilities; and determining a difference between the selected standard probability and the largest standard probability as the relative probability value corresponding to the selected standard probability.

(b) Determine a largest relative probability value from relative probability values corresponding to the standard probabilities in the standard probability set.

The relative probability values corresponding to the standard probabilities in the standard probability set are compared, to determine the largest relative probability value in the relative probability values.

(c) Determine, from the n sample images, a sample image corresponding to the largest relative probability value, and determine, from the t to-be-trained neural network models, a to-be-trained neural network model corresponding to the largest relative probability value.

Because the n*t standard probabilities are determined by using the b to-be-trained neural network models, where the standard probability is of each of the n sample images, and is processed by each of the t to-be-trained neural network models, and the standard probability set includes the n*t standard probabilities, one standard probability in the standard probability set corresponds to one sample image in the n sample images, and corresponds to one to-be-trained neural network model in the t to-be-trained neural network models. The relative probability value is determined based on the standard probabilities. Therefore, each relative probability value also corresponds to one sample image in the n sample images, and corresponds to one to-be-trained neural network model in the t to-be-trained neural network models. In this way, after the largest relative probability value is determined, the sample image corresponding to the largest relative probability value is determined from the n sample images, and the to-be-trained neural network model corresponding to the largest relative probability value is determined from the t to-be-trained neural network models.

(d) Determine, based on the to-be-trained neural network model corresponding to the largest relative probability value, a first weight of a sample image corresponding to the largest relative probability value.

In some embodiments, if the to-be-trained neural network model corresponding to the largest relative probability value is the to-be-trained neural network model k, the first weight of the sample image corresponding to the largest relative probability value is determined to be $$a+\frac{1-a}{t}.$$

If the to-be-trained neural network model corresponding to the largest relative probability value is not the to-be-trained neural network model k, the first weight of the sample image corresponding to the largest relative probability value is determined to be $$\frac{1-a}{t}\cdot a$$

is a set real number, and meets a≥0, and a≤1.

(e) Remove, from the standard probability set, a standard probability corresponding to the sample image corresponding to the largest relative probability value.

Because the n*t standard probabilities are determined by using the b to-be-trained neural network models, where the standard probability is of each of the n sample images, and is processed by each of the t to-be-trained neural network models, one sample image corresponds to t standard probabilities. In this way, after the sample image corresponding to the largest relative probability value is determined, the t standard probabilities corresponding to the sample image may be removed from the standard probability set. In this case, the standard probability set further has n*(t−1) standard probabilities.

(f) If the standard probability set is not null after the removal, update a model determining quantity, where the model determining quantity is a quantity of times of determining, from the t to-be-trained neural network models, the to-be-trained neural network model corresponding to the largest relative probability value.

In an example, the model determining quantity may be increased by 1. To be specific, each time a largest relative probability value is determined in one cycle, and a to-be-trained neural network model corresponding to the largest relative probability value is determined from the t to-be-trained neural network models, the model determining quantity may be increased by 1. Certainly, this is only an example of an update manner, and may be another manner.

(g) If the updated model determining quantity is greater than or equal to n/t, remove, from the standard probability set, a standard probability corresponding to the to-be-trained neural network model corresponding to the largest relative probability value, and return to step (a) to determine the relative probability value corresponding to each standard probability in the standard probability set.

Because the n*t standard probabilities are determined by using the b to-be-trained neural network models, where the standard probability is of each of the n sample images, and is processed by each of the t to-be-trained neural network models, one of the t to-be-trained neural network models corresponds to n standard probabilities. In this way, n standard probabilities corresponding to the to-be-trained neural network model corresponding to the largest relative probability value may be removed from the standard probability set. In this case, there are still (n−1)*(t−1) standard probabilities in the standard probability set.

(13) Perform normalization processing on the first weight corresponding to each of the n sample images, to obtain the weight function value corresponding to each of the n sample images.

In a second implementation, the n weight function values are implemented based on meta-learning. After the n weight function values are determined in this implementation, the to-be-trained neural network model k can have a low classification loss on some images.

In the second implementation, the n weight function values may be determined based on the n sample images and the n sample labels by using the following steps (21) to (27).

(21) Select, from the n sample images by using b to-be-trained neural network models, h sample images that are processed by the to-be-trained neural network model k next time, where the b to-be-trained neural network models are models, in the m to-be-trained neural network models, that are before the to-be-trained neural network model k and that are allowed to be used to process the n sample images, and h is less than n.

In some embodiments, one sample image is selected from the n sample images, and one to-be-trained neural network model is selected from the b to-be-trained neural network models. The selected sample image is input into the selected to-be-trained neural network model, to obtain a selection result output by the selected to-be-trained neural network model. The selection result includes a probability corresponding to a to-be-trained neural network model, in the m to-be-trained neural network models, that is after the selected to-be-trained neural network model and that is allowed to be used to process the selected sample image. If a to-be-trained neural network model corresponding to a largest probability in the selection result is the to-be-trained neural network model k, the selected sample image is determined as a sample image processed by the to-be-trained neural network model k next time. All sample images and each of the b to-be-trained neural network models are traversed by using the foregoing method, to obtain the h sample images.

(22) Determine, by using a meta network model, a prediction weight corresponding to each of the n sample images.

In some embodiments, each sample image in the n sample images may be input into the meta network model, to obtain a prediction weight corresponding to a corresponding sample image output by the meta network model. To be specific, for any sample image in the n sample images, after the sample image is input into the meta network model, a prediction weight that is output by the meta network model and that corresponds to the sample image may be obtained.

(23) Determine a weighted loss value of the n sample images based on a prediction weight corresponding to each of the n sample images and a classification function value corresponding to each of the n sample images.

(24) Update the to-be-trained neural network model k based on the weighted loss value of the n sample images.

(25) Input the selected h sample images into the updated to-be-trained neural network model k, to obtain a total loss value of the updated to-be-trained neural network model k on the h sample images.

(26) Update the meta network model based on the total loss value of the updated to-be-trained neural network model k on the h sample images.

(27) Determine, by using the updated meta network model, the weight function value corresponding to each of the n sample images.

In some embodiments, each sample image in the n sample images may be input into the updated meta network model, to obtain a weight function value that is output by the updated meta network model and that corresponds to the corresponding sample image. To be specific, for any sample image in the n sample images, after the sample image is input into the updated meta network model, a weight function value that is output by the updated meta network model and that corresponds to the sample image may be obtained.

The foregoing manner of determining the n weight function values is only one of meta learning-based manners. In actual application, there is another meta learning-based manner. For example, the n weight function values may be determined based on the n sample images and the n sample labels by using the following steps (31) to (37).

(31) Select, from the n sample images by using b to-be-trained neural network models, h sample images that are processed by the to-be-trained neural network model k next time, where the b to-be-trained neural network models are models, in the m to-be-trained neural network models, that are before the to-be-trained neural network model k and that are allowed to be used to process the n sample images, and h is less than n.

(32) Determine an initial weight corresponding to each of the n sample images.

In some embodiments, an initial weight may be set for each of the h sample images. For example, the initial weight may be 0.

(33) Determine a weighted loss value of the n sample images based on the initial weight corresponding to each of the n sample images.

(34) Update the to-be-trained neural network model k based on the weighted loss value of the n sample images.

(35) Input the selected h sample images into the updated to-be-trained neural network model k, to obtain a total loss value of the updated to-be-trained neural network model k on the h sample images.

(36) Determine, based on the total loss value of the updated to-be-trained neural network model k on the h sample images and the initial weight corresponding to each of the n sample images, a second weight corresponding to each of the n sample images.

(37) Perform normalization processing on the second weight corresponding to each of the n sample images, to obtain the weight function value corresponding to each of the n sample images.

Process of Determining the n Label Function Values

In this embodiment of this application, a label function value corresponding to a sample image is related to accuracy of a classification result that a to-be-trained neural network model that is after the to-be-trained neural network model k and that is allowed to be used to process the sample image has on the sample image. In other words, if a to-be-trained neural network model is used to determine the label function value corresponding to the sample image, accuracy of a classification result that the to-be-trained neural network model has on the sample image is high, and accuracy of a classification result that another to-be-trained neural network model has on the sample image is low. The n label function values may be determined based on the n sample images and the n sample labels by using the following steps (41) and (42).

(41) Determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images.

In some embodiments, a probability, of a corresponding sample label, to which each of the n sample images belongs is determined by using each of the s to-be-trained neural network models, to obtain n*s probabilities. Average probabilities that are in the n*s probabilities and that correspond to a same to-be-trained neural network model in the s to-be-trained neural network models are divided into a probability set, to obtain s probability sets. Standardization processing is performed on the n*s probabilities based on the n*s probabilities and the s probability sets, to obtain the n*s standard probabilities.

Manners of determining, by each of the s to-be-trained neural network models, a standard probability, of a corresponding sample label, to which each of the n sample images belongs are the same. Therefore, one to-be-trained neural network model may be selected from the s to-be-trained neural network models, one sample image may be selected from the n sample images, and a probability, of a corresponding sample label, to which the selected sample image belongs is determined by using the selected to-be-trained neural network model and based on the following operation, until the n*s probabilities are determined: inputting the selected sample image into the selected to-be-trained neural network model, to obtain a classification result output by the selected to-be-trained neural network model, where the classification result includes a probability that the selected sample image belongs to each of the plurality of categories. The plurality of categories may include a sample label corresponding to the selected sample image. In this way, the probability, of the corresponding sample label, to which the selected sample image belongs may be determined by using the selected to-be-trained neural network model.

(42) Determine, based on the n*s standard probabilities, the label function value corresponding to each of the n sample images.

In some embodiments, the n*s standard probabilities may be used to form a standard probability set, and a relative probability value corresponding to each standard probability in the standard probability set is determined. A largest relative probability value is determined from relative probability values corresponding to standard probabilities in the standard probability set, a sample image corresponding to the largest relative probability value is determined from the n sample images, and a to-be-trained neural network model corresponding to the largest relative probability value is determined from the s to-be-trained neural network models. A location number of the to-be-trained neural network model that corresponds to the largest relative probability value and that is in the s to-be-trained neural network models is determined as a label function value of the sample image corresponding to the largest relative probability value. A standard probability corresponding to the sample image corresponding to the largest relative probability value is removed from the standard probability set. If the standard probability set is not null after the removal, a model determining quantity is updated, where the model determining quantity is a quantity of times of determining, from the s to-be-trained neural network models, the to-be-trained neural network model corresponding to the largest relative probability value. If the updated model determining quantity is greater than or equal to n/s, a standard probability corresponding to the to-be-trained neural network model corresponding to the largest relative probability value is removed from the standard probability set, and the step of determining the relative probability value corresponding to each standard probability in the standard probability set is returned to.

Process of Determining the n Classification Loss Function Values

Because manners of determining a classification loss function value corresponding to each sample image are the same, one sample image may be selected from the n sample images, and a classification loss function value corresponding to the selected sample image is determined based on the following operations, until the classification loss function value corresponding to each sample image is determined: determining, by using the to-be-trained neural network model k, a probability, of the selected sample image, that each of the s to-be-trained neural network models is used to process, to obtain s probabilities; and determining, based on a label function value corresponding to the selected sample image and the s probabilities, the classification loss function value corresponding to the selected sample image.

In some embodiments, the selected sample image may be input into the to-be-trained neural network model k, to obtain a selection result output by the to-be-trained neural network model k. The selection result includes a probability, of the selected sample image, that each of the s to-be-trained neural network models is used to process, that is, a probability that a next neural network model that classifies the selected sample image is each of the s to-be-trained neural network models; and the s probabilities are obtained.

Process of Determining the n Selection Weight Function Values

In this embodiment of this application, a selection weight function value corresponding to a sample image is related to a variance of accuracy of a classification result that a to-be-trained neural network model that is after the to-be-trained neural network model k and that is allowed to be used to process the n sample images has on the sample image. To be specific, a large variance of accuracy of a classification result that the to-be-trained neural network model that is after the to-be-trained neural network model k and that is allowed to be used to process the n sample images has on a sample image indicates a large selection weight function value corresponding to the sample image. A small variance of accuracy of a classification result that the to-be-trained neural network model that is after the to-be-trained neural network model k and that is allowed to be used to process the n sample images has on a sample image indicates a small selection weight function value corresponding to the sample image.

In some embodiments, a standard probability, of a corresponding sample label, to which each of the n sample images belongs is determined by using each of the s to-be-trained neural network models, to obtain n*s standard probabilities. The selection weight function value corresponding to each of the n sample images is determined based on the n*s standard probabilities.

An implementation process of determining, based on the n*s standard probabilities, the selection weight function value corresponding to each of the n sample images includes: dividing probabilities that are in the n*s standard probabilities and that correspond to a same sample image in the n sample images into one probability set, to obtain n probability sets; determining a standard deviation of standard probabilities included in each of the n probability sets, to obtain n standard deviations; and performing normalization processing on each of the n standard deviations, to obtain the selection weight function value corresponding to each of the n sample images.

According to a second aspect, a computer device is provided. The computer device has a function of implementing behavior of the image classification method in the first aspect, or has a function of implementing behavior of the neural network model training method in the first aspect. The function may be implemented by hardware, or may be implemented by hardware executing corresponding software. The hardware or the software includes one or more modules corresponding to the foregoing function.

In a possible implementation, the computer device includes:

an image processing module, configured to process a to-be-classified target image by using a current neural network model, to obtain a current classification result output by the current neural network model, where the current classification result includes a probability that the target image belongs to each of a plurality of categories, the current neural network model is a neural network model i corresponding to a largest probability in a selection result output by a neural network model a, the selection result output by the neural network model a includes probabilities corresponding to p neural network models in m trained neural network models, the p neural network models are neural network models that are after the neural network model a and that are allowed to be used to process the target image, the m neural network models include the neural network model i and the neural network model a, m is an integer greater than 1, and p is an integer greater than or equal to 1;

an integration result determining module, configured to determine a current integration result based on the current classification result, where the current integration result includes an integrated probability that the target image belongs to each of the plurality of categories; and an image category determining module, configured to determine a category of the target image based on the current integration result.

The image processing module, the integration result determining module, and the image category determining module may perform corresponding functions in the image classification method example in the first aspect. For details, refer to detailed description in the method example. Details are not described herein again.

In another possible implementation, the computer device includes:

a sample obtaining module, configured to obtain n sample images and n sample labels, where the n sample labels one-to-one correspond to the n sample images;

a gradient determining module, configured to determine, based on the n sample images and the n sample labels, a gradient of each parameter of each of m to-be-trained neural network models; and a model update module, configured to update the m to-be-trained neural network models based on the gradient of each parameter of the m to-be-trained neural network models, to obtain m trained neural network models.

The sample obtaining module, the gradient determining module, and the model update module may perform corresponding functions in the neural network model training method example in the first aspect. For details, refer to detailed description in the method example. Details are not described herein again.

According to a third aspect, a computer device is provided. The computer device includes a processor and a memory, and the memory is configured to store computer program instructions for performing the method provided in the first aspect. The processor is configured to execute the computer program instructions stored in the memory, to implement the method according to the first aspect.

Optionally, the computer device may further include a communication bus, and the communication bus is configured to establish a connection between the processor and the memory.

According to a fourth aspect, a computer-readable storage medium is provided. The storage medium stores instructions, and when the instructions are run on a computer, the computer is enabled to perform the steps of the method according to the first aspect.

According to a fifth aspect, a computer program product including instructions is provided. When the instructions are run on a computer, the computer is enabled to perform the steps of the method according to the first aspect. In other words, a computer program is provided. When the computer program runs on a computer, the computer device is enabled to perform the steps of the method according to the first aspect.

Technical effects achieved in the second aspect, the third aspect, the fourth aspect, and the fifth aspect are similar to those achieved by a corresponding technical means in the first aspect. Details are not described again herein.

The technical solutions provided in embodiments of this application can achieve at least the following beneficial effects:

In embodiments of this application, for the m neural network models obtained through training, during image classification, a part of neural network models are selected from the m neural network models based on the to-be-classified target image to process the target image, to determine the category of the target image, and a classification result of each of the m neural network models does not need to be obtained. This greatly reduces calculation overheads, and improves image classification efficiency.

BRIEF DESCRIPTION OF THE DRAWINGS

FIG. 3A to FIG. 3C are a schematic diagram of an interface for enabling an album classification function according to an embodiment of this application;

DETAILED DESCRIPTION OF ILLUSTRATIVE EMBODIMENTS

Figures 1, 2:
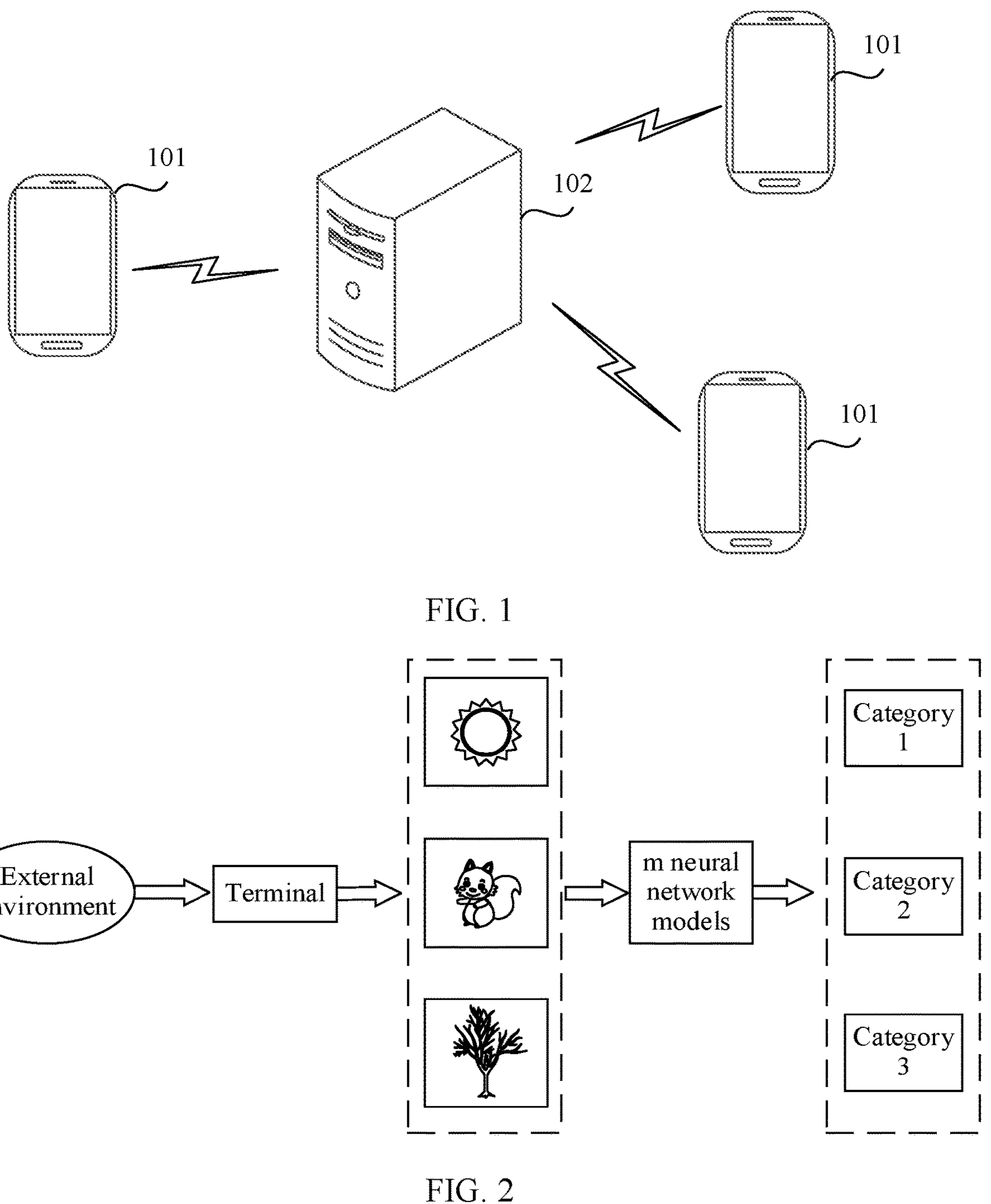
FIG. 1 is a schematic diagram of an implementation environment according to an embodiment of this application.
FIG. 2 is a schematic diagram of an example of an implementation environment according to an embodiment of this application.

To make the objectives, technical solutions, and advantages of embodiments of this application clearer, the following further describes the implementations of this application in detail with reference to the accompanying drawings.

For ease of understanding, before embodiments of this application are explained in detail, terms in embodiments of this application are first explained.

Neural network model: A neural network model is a complex network system including a large quantity of simple processing units (referred to as neurons) that are widely connected to each other, and is a highly complex nonlinear dynamic learning system. The neural network model has abilities such as large-scale paralleling, distributed storage and processing, self-organization, self-adaptation, and self-learning, and is especially suitable for dealing with problems in which imprecise and fuzzy information is processed and a plurality of factors and conditions need to be considered simultaneously.

The neural network model includes a convolutional neural network model. The convolutional neural network model is a feedforward neural network model that includes convolutional computing and that has a deep structure, and is one of representative algorithms of deep learning. The neural network model in embodiments of this application may be the convolutional neural network model.

The convolutional neural network model includes a convolutional layer, a pooling layer, a fully connected layer, and a non-linear activation layer. The convolutional layer is a core of the convolutional neural network model, and parameters of the convolutional layer include a group of learnable kernels. During feedforward, each convolution kernel performs convolution on an input to extract a high-level feature. The pooling layer, also referred to as downsampling, is used to reduce an amount of data that is processed, and retain useful information. Usually, the pooling layer selects a largest value from every four neighboring pixels to become one pixel. Both an input and an output of the fully connected layer are one-dimensional vectors. In essence, a fully connected operation is a multiplication operation of a matrix. The input is a vector; the matrix is a parameter stored in the neural network model; and the output is a product of the vector and the matrix, and is also a vector. The non-linear activation layer includes a rectified linear unit (ReLU), sigmoid, tanh (hyperbolic tangent function), and the like, which are recognized as common non-linear activation functions in the industry, are all element-level operations, and do not change a size of a feature.

Parameters of a neural network model: Any neural network model includes a large quantity of learnable parameters, and the parameters are referred to as parameters of the neural network model.

Structure of a neural network model: The structure is one of important attributes of the neural network model, which affects precision and efficiency of the network model. Typical structures include VGG, ResNets, MobileNet, and the like.

Training of a neural network: A neural network model includes a large quantity of learnable parameters, and training of the neural network model is a process of determining a value of the learnable parameter based on a data set and a training algorithm.

Inference of a neural network: After a neural network model is trained, a trained neural network model is applied to new data to obtain a prediction result of the new data (for example, a category of the new data). This process is referred to as inference of the neural network model. In embodiments of this application, the inference of the neural network model is specifically image classification, that is, determining a category of a target image.

A method provided in embodiments of this application may be applied to various scenarios. An image classification scenario is merely an example. For example, the method may be further applied to various inference scenarios such as video recognition, speech recognition, and image signal processing. For any inference scenario, inference processing may be performed on to-be-inferred first data by using a current neural network model, to obtain a current inference result output by the current neural network model. The current inference result varies with different inference scenarios, and the current neural network model is a neural network model i corresponding to a largest probability in a selection result output by a neural network model a. The selection result output by the neural network model a includes a probability corresponding to a neural network model, in m trained neural network models, that is after the current neural network model and that is allowed to be used to perform inference processing on the first data. The m neural network models include the neural network model i and the neural network model a, and m is an integer greater than 1. An inference result of the first data is determined based on the current inference result.

The following describes an implementation environment of an embodiment of this application by using image classification as an example in this embodiment of this application.

FIG. 1 is a schematic diagram of an implementation environment according to an embodiment of this application. The implementation environment includes a plurality of terminals 101 and a server (for example, a cloud server) 102. Each of the plurality of terminals 101 is connected to the server 102 in a wireless or wired manner, to perform communication.

For the implementation environment shown in FIG. 1, image classification may be performed in a plurality of different implementations in this embodiment of this application.

In a first implementation, the server 102 trains m to-be-trained neural network models, to obtain m trained neural network models. Then, the server 102 deploys the m trained neural network models on each of the plurality of terminals 101. Each of the plurality of terminals 101 obtains a target image, and processes the target image based on the m trained neural network models, to determine a category of the target image.

The target image obtained by the terminal 101 may be an image stored in the terminal 101, or may be an image obtained by the terminal 101 by shooting an external environment. Certainly, the target image may be obtained in another manner. This is not limited in this embodiment of this application. For example, refer to FIG. 2. The terminal may shoot the external environment by using a built-in camera, to obtain the target image. For example, three images are obtained in FIG. 2. Then, each of the three images may be processed based on the m neural network models, to determine a category of each image.

In a second implementation, the server 102 trains m to-be-trained neural network models, to obtain m trained neural network models. Each of the plurality of terminals 101 obtains a target image, and sends the target image to the server 102. The server 102 receives the target image sent by the terminal 101, and processes the target image based on the m neural network models, to determine a category of the target image.

Certainly, in addition to the foregoing two implementations, image classification may further be performed in another implementation. For example, the terminal 101 trains m to-be-trained neural network models, to obtain m trained neural network models. Then, the terminal 101 obtains a target image, and processes the target image based on the m neural network models, to determine a category of the target image.

It should be noted that the terminal 101 may be any electronic product that can perform human-computer interaction with a user in one or more manners such as by using a touchpad, a touchscreen, or a voice interaction or handwriting device, for example, a mobile phone, a personal digital assistant (PDA), a wearable device, a tablet computer, smart infotainment, or a smart television. The server 102 may be a single server, or may be a server cluster including a plurality of servers.

The following describes an example of an implementation process of the image classification in embodiments of this application.

An image classification method provided in embodiments of this application may be applied to album classification. In other words, for a plurality of images shot by a terminal, different albums may be generated for the plurality of images based on different categories. However, before album classification is performed based on the image classification method provided in embodiments of this application, an album classification function needs to be enabled. Certainly, the album classification function may alternatively be enabled by default. This is not limited in embodiments of this application. The following describes how to manually enable the album classification function.

When detecting a setting operation, the terminal displays a setting interface, where the setting interface includes a plurality of setting options, and the plurality of setting options include an album setting option. When detecting a selection operation of the album setting option, the terminal may display the album setting interface, where the album setting interface includes a plurality of album setting options, and the plurality of album setting options include an album classification option. When detecting an enabling operation of the album classification option, the terminal determines that the album classification function is currently enabled.

Figure 3A:
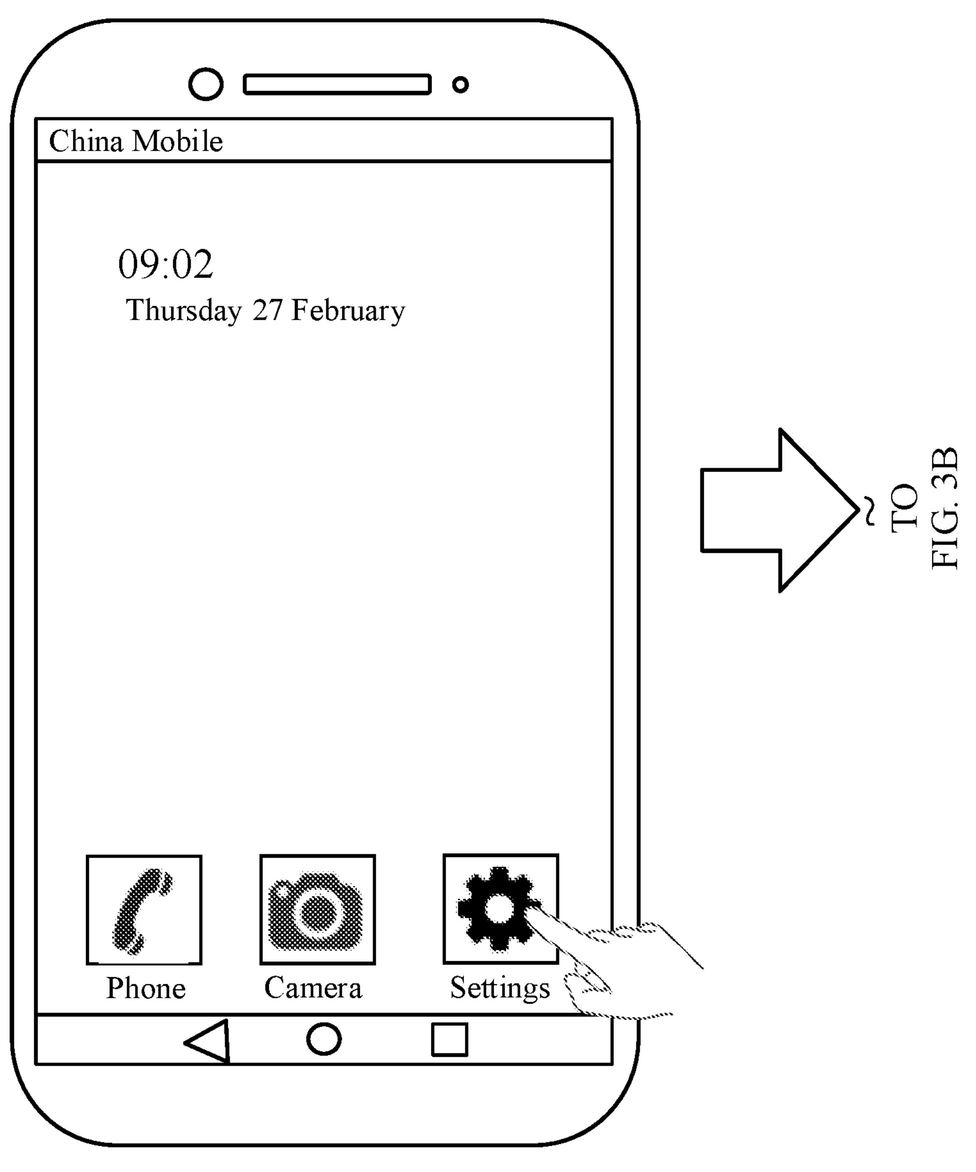
Figure 3B:
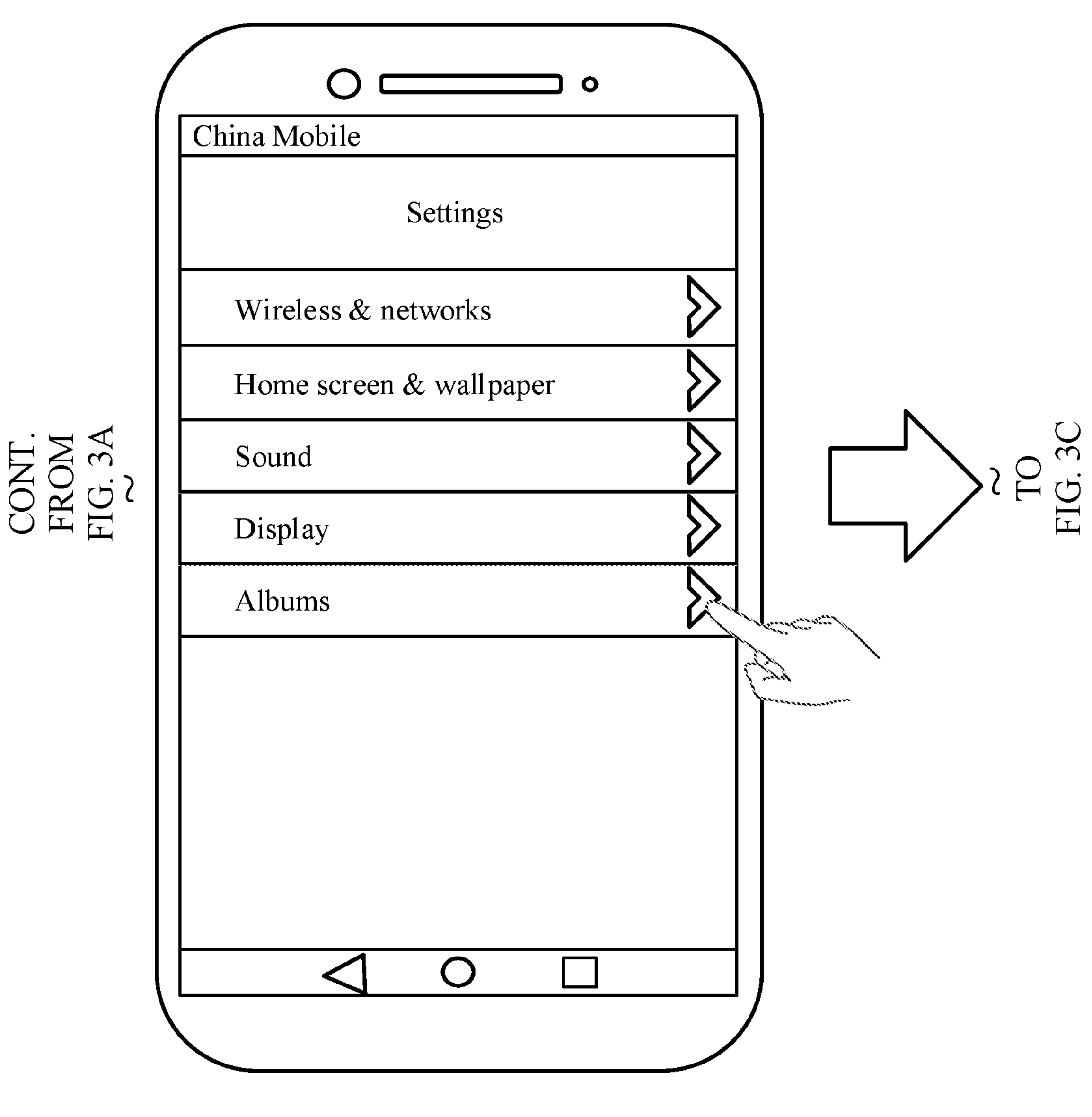
Figure 3C:
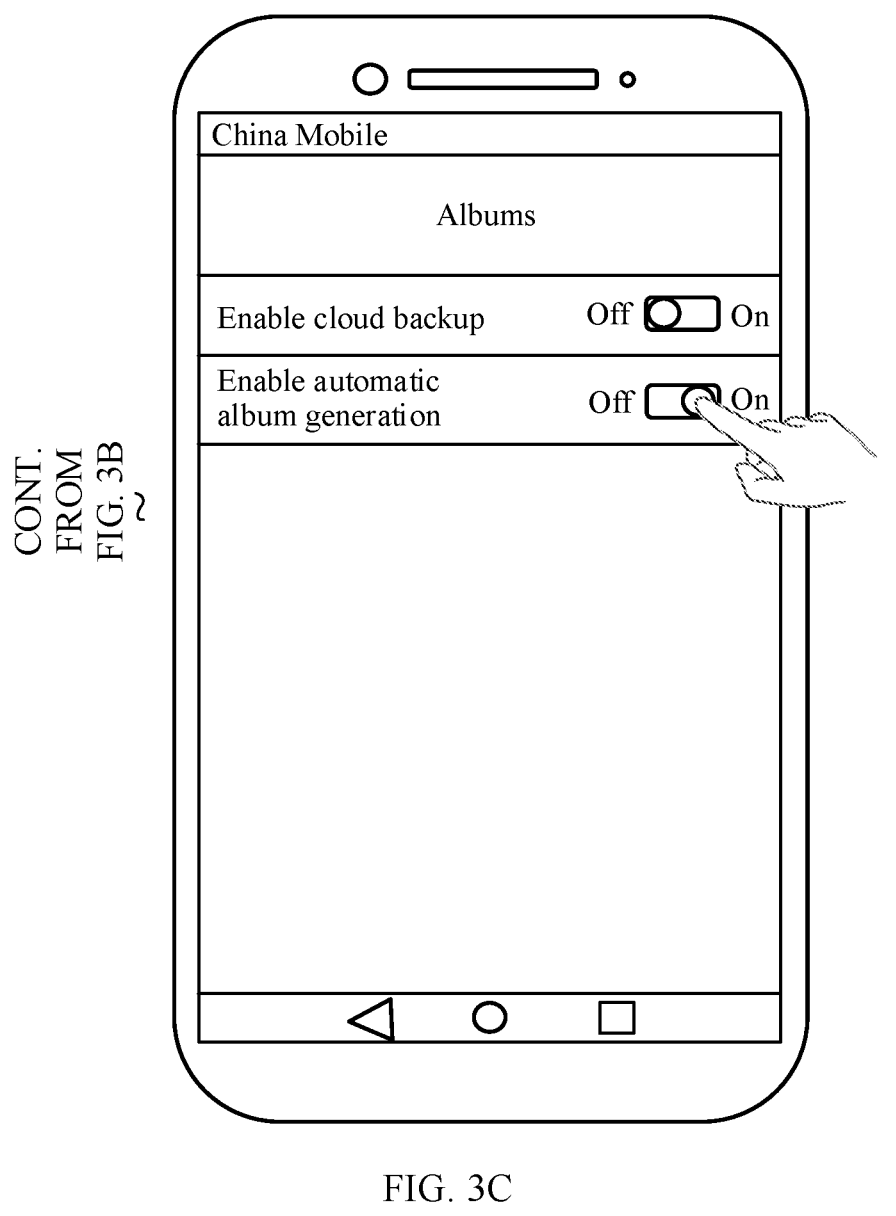

For example, refer to the left figure in FIG. 3A to FIG. 3C. When detecting a tap operation of a Settings icon, the terminal may display the setting interface, as shown in the middle figure in FIG. 3A to FIG. 3C. The setting interface includes a plurality of setting options, which are separately Wireless & networks, Home screen & wallpaper, Sound, Display, and Albums. When detecting a selection operation of Albums, the terminal may display the album setting interface, as shown in the right figure in FIG. 3A to FIG. 3C. The album setting interface includes a plurality of album setting options, which are separately Enable cloud backup and Enable automatic album generation, and each setting option corresponds to one switch. When detecting an enabling operation of a switch corresponding to Enable automatic album generation, the terminal determines that the album classification function is currently enabled. In other words, when a user taps the Settings icon shown in the left figure in FIG. 3A to FIG. 3C, the setting interface shown in the middle figure in FIG. 3A to FIG. 3C is displayed. When the user taps Albums in the setting interface, the album setting interface shown in the right figure in FIG. 3A to FIG. 3C is displayed. When the user taps the switch corresponding to Enable automatic album generation in the album setting interface, it is determined that the album classification function is currently enabled.

After the album classification function is enabled, after shooting an image, the terminal may determine a category of the image by using any one of the foregoing plurality of implementations, to add the image to an album of the corresponding category based on the category of the image. If the album of the corresponding category does not exist before the image, the terminal may generate the album of the corresponding category, and add the image to the album.

Figure 4:
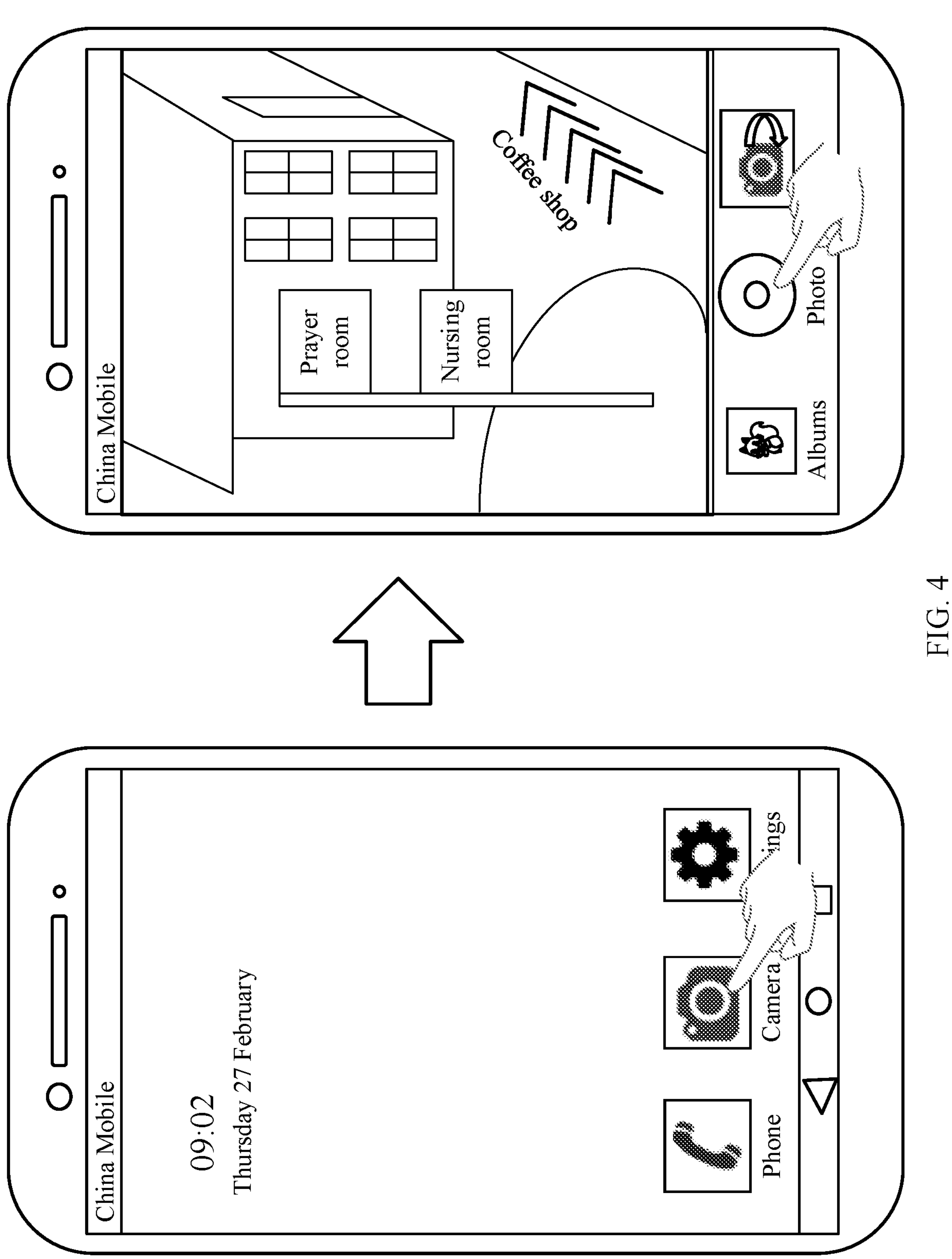
FIG. 4 is a schematic diagram of an interface for shooting a photo according to an embodiment of this application.

For example, refer to the left figure in FIG. 4. When detecting a tapping operation of a Camera icon, the terminal may display a camera shooting interface, as shown in the right figure in FIG. 4. The camera shooting interface includes a plurality of buttons, which are separately an Albums button, a Photo button, and a lens rotation button. When detecting a tapping operation of the Photo button, the terminal may shoot an image in a viewfinder frame, to capture a photo, for example, a photo of a building shown in the right figure in FIG. 4.

Figure 5:
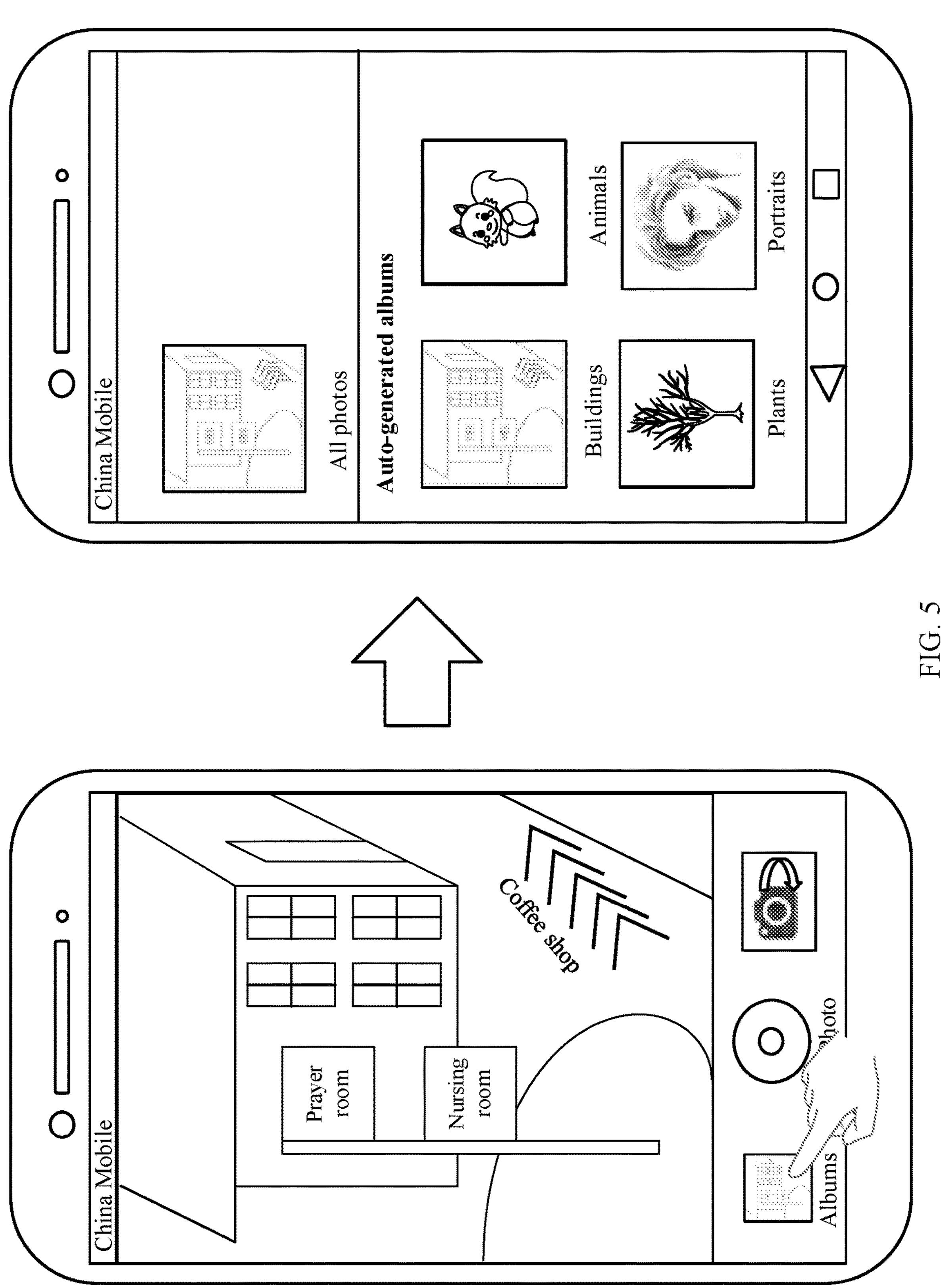
FIG. 5 is a schematic diagram of an interface of album classification according to an embodiment of this application.

Refer to the left figure in FIG. 5. When detecting a tap operation of the Albums button, the terminal may display an album interface, as shown in the right figure in FIG. 5. The album interface includes all shot photos, and for each shot photo, a category of the photo may be determined by using any one of the foregoing plurality of implementations, to add the photo to a corresponding album. For example, for a currently shot photo of a building, when it is determined, by using any one of the foregoing plurality of implementations, that a type of the photo is the building, the photo may be added to a building album.

Figure 6:
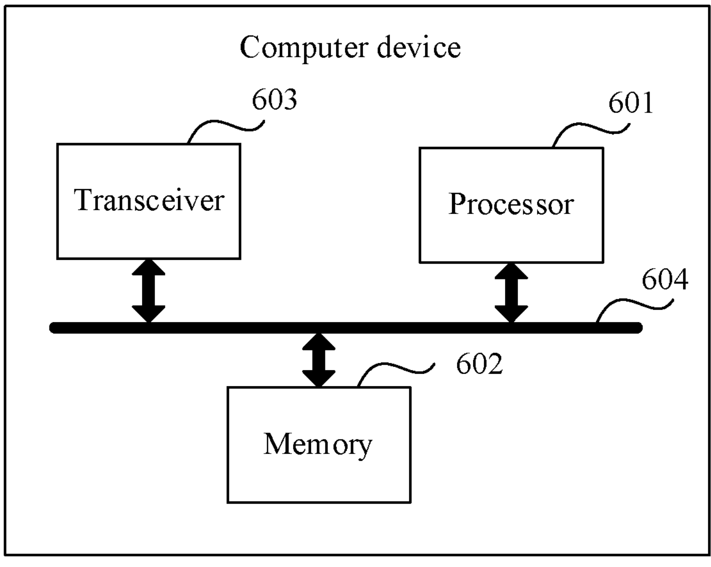
FIG. 6 is a schematic diagram of a structure of a computer device according to an embodiment of this application.

FIG. 6 is a schematic diagram of a structure of a computer device according to an embodiment of this application. The computer device may be the terminal 101, or may be the server 102. The computer device includes a processor 601, a memory 602, and a transceiver 603. The components may be connected to each other through a communication bus 604, for communication.

The processor 601 may be a general-purpose central processing unit (CPU), a network processor (NP), or a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 602 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, this is not limited hereto. The memory 602 may exist independently, and is connected to the processor 601 through the communication bus 604. Alternatively, the memory 602 may be integrated with the processor 601.

The transceiver 603 is configured to communicate with another device or a communication network by using any apparatus such as a transceiver. The transceiver 603 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

The communication bus 604 is configured to transmit information between the foregoing components. The communication bus 604 may be classified into an address bus, a data bus, a control bus, or the like. For ease of representation, only one bold line is used for representation in the figure, but this does not mean that there is only one bus or only one type of bus.

In an embodiment, the processor 601 may include one or more CPUs. The computer device may include a plurality of processors. Each of the processors may be a single-core processor, or may be a multi-core processor. The processor herein may be one or more devices, circuits, and/or processing cores configured to process data (for example, computer program instructions).

In an embodiment, the computer device may further include an output device and an input device. The output device communicates with the processor 601, and may display information in a plurality of manners. For example, the output device may be a liquid crystal display (LCD), a light-emitting diode (LED) display device, a cathode ray tube (CRT) display device, or a projector. The input device communicates with the processor 601, and may receive an input of a user in a plurality of manners. For example, the input device may be a mouse, a keyboard, a touchscreen device, or a sensing device.

In some embodiments, the memory 602 is configured to store program code for performing the solutions of this application, and the processor 601 may execute the program code stored in the memory 602. The program code may include one or more software modules. The computer device may implement the image classification method provided in embodiments of this application by using the processor 601 and the program code in the memory 602.

Figure 7:
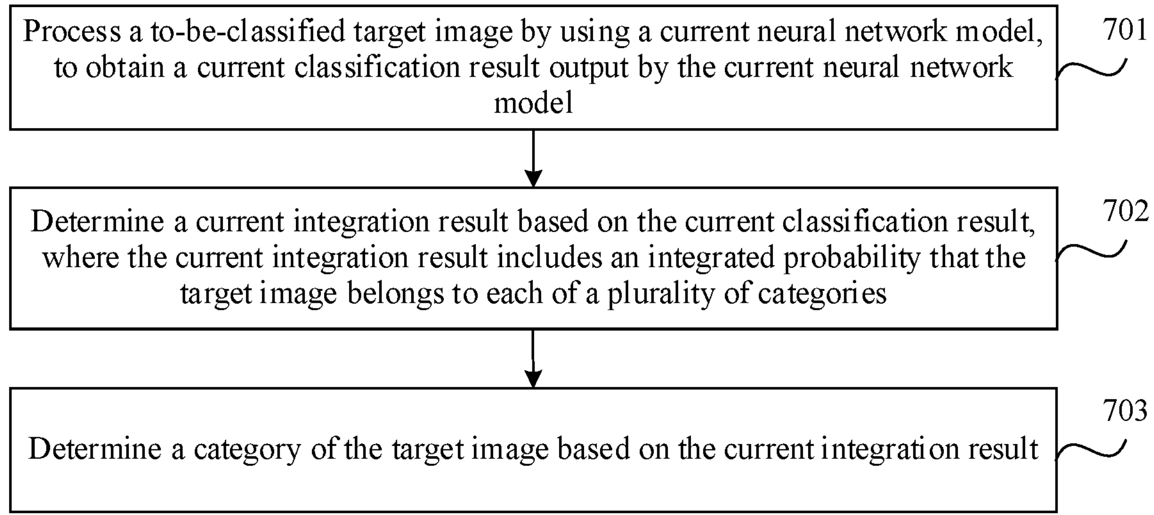
FIG. 7 is a flowchart of an image classification method according to an embodiment of this application.

FIG. 7 is a flowchart of an image classification method according to an embodiment of this application. The method is applied to a computer device. The method includes the following steps.

Step 701: Process a to-be-classified target image by using a current neural network model, to obtain a current classification result output by the current neural network model.

The current classification result includes a probability that the target image belongs to each of a plurality of categories, the current neural network model is a neural network model i corresponding to a largest probability in a selection result output by a neural network model a, the selection result output by the neural network model a includes probabilities corresponding to p neural network models in m trained neural network models, the p neural network models are neural network models that are after the neural network model a and that are allowed to be used to process the target image, the p neural network models include the neural network model i, the m neural network models include the neural network model a, m is an integer greater than 1, p is an integer greater than or equal to 1, and p is less than m.

In some embodiments, the current neural network model may further output a current selection result, the current selection result includes probabilities corresponding to d neural network models in the m neural network models, the d neural network models are neural network models that are after the neural network model i and that are allowed to be used to process the target image, d is an integer greater than or equal to 1, and d is less than m. In other words, in this embodiment of this application, the target image may be processed by using the current neural network model in two implementations. The following describes the two implementations.

In a first implementation, the target image is input into the current neural network model, to obtain the current classification result and the current selection result that are output by the current neural network model.

To be specific, in the first implementation, any neural network model in the m neural network networks is used as the current neural network model. After the target image is input into the current neural network model, the current neural network model can not only output the current classification result about the target image, but also determine a probability, namely, the current selection result, corresponding to a neural network model that is after the current neural network model and that is allowed to be used to process the target image.

A large probability corresponding to the neural network model that is after the current neural network model and that is allowed to be used to process the target image indicates high classification precision of the neural network model for the target image. In addition, usually, classification precision of the neural network model i for the target image is higher than classification precision of the neural network model a for the target image.

In a second implementation, the target image and a current iteration quantity are input into the current neural network model, and the target image is processed by using the current neural network model.

There are two cases in the second implementation, and the two cases are separately described below.

In a first case, the target image and the current iteration quantity are input into the current neural network model, to obtain the current classification result output by the current neural network model.

To be specific, in the first case, the current iteration quantity of the input current neural network model is less than an iteration quantity threshold, and a difference between the current iteration quantity and the iteration quantity threshold is 1. In this way, after the target image is processed by using the current neural network model, the current iteration quantity already reaches the quantity threshold, and no subsequent iteration needs to be performed. Therefore, the current neural network model may output only the current classification result.

In a second case, the target image and the current iteration quantity are input into the current neural network model, to obtain the current classification result and the current selection result that are output by the current neural network model.

To be specific, in the second case, the current iteration quantity of the input current neural network model is less than an iteration quantity threshold, and a difference between the current iteration quantity and the iteration quantity threshold is greater than 1. In this way, after the target image is processed by using the current neural network model, the current iteration quantity does not reach the quantity threshold, and the iteration may further need to be performed subsequently. Therefore, the current neural network model needs to output the current classification result and the current selection result.

Step 702: Determine a current integration result based on the current classification result, where the current integration result includes an integrated probability that the target image belongs to each of the plurality of categories.

In some embodiments, an average value of probabilities of corresponding categories in a plurality of classification results may be determined as a probability of a corresponding category in the current integration result, where the plurality of classification results include the classification result output by the neural network model a and a classification result output by the neural network model i. Alternatively, the current classification result is directly determined as the current integration result.

To be specific, a probability of a first category in the current integration result includes an average value of probabilities of the first category in the plurality of classification results, where the plurality of classification results include the classification result output by the neural network model a and the classification result output by the neural network model i. Alternatively, a probability of a first category in the current integration result includes a probability of the first category in the classification result output by the neural network model i. The first category is one of the plurality of categories.

For example, the target image is processed by using three neural network models, to obtain three classification results: a classification result 1, a classification result 2, and a classification result 3. The three classification results all include probabilities that the target image belongs to five categories. An average value of probabilities that are in the three classification results and that the target image belongs to a category 1 is determined as a probability that is in the integration result and that the target image belongs to the category 1, an average value of probabilities that are in the three classification results and that the target image belongs to a category 2 is determined as a probability that is in the integration result and that the target image belongs to the category 2, an average value of probabilities that are in the three classification results and that the target image belongs to a category 3 is determined as a probability that is in the integration result and that the target image belongs to the category 3, an average value of probabilities that are in the three classification results and that the target image belongs to a category 4 is determined as a probability that is in the integration result and that the target image belongs to the category 4, and an average value of probabilities that are in the three classification results and that the target image belongs to a category 5 is determined as a probability that is in the integration result and that the target image belongs to the category 5.

Step 703: Determine a category of the target image based on the current integration result.

Based on the description in the foregoing step 701, there are two implementations for processing the target image by using the current neural network model. In different implementations, different categories of the target image are determined based on the current integration result. Therefore, the following also uses two implementations for description.

In a first implementation, in step 701, when the target image is processed by using the current neural network model based on the first implementation, that the category of the target image is determined based on the current integration result includes: If the current integration result meets a first convergence condition or the current neural network model meets a second convergence condition, a category corresponding to a largest probability in the current integration result is determined as the category of the target image. If the current integration result does not meet the first convergence condition and the current neural network model does not meet the second convergence condition, the neural network model corresponding to the largest probability in the current selection result is used as the current neural network model, and the target image is reprocessed by using the method in the foregoing steps 701 to 703.

In the first implementation, each neural network model outputs a classification result and a selection result. Therefore, after the current integration result is determined based on the current classification result output by the current neural network model, whether the current integration result meets the first convergence condition needs to be determined, and whether the current neural network model meets the second convergence condition needs to be determined. If the current integration result meets the first convergence condition or the current neural network model meets the second convergence condition, it indicates that reliability of the current integration result is high. The category corresponding to the largest probability in the current integration result is determined as the category of the target image. If the current integration result does not meet the first convergence condition and the current neural network model does not meet the second convergence condition, it indicates that reliability of the current integration result is not high, the neural network model corresponding to the largest probability in the current selection result is used as the current neural network model, and the target image is reprocessed by using the method in the foregoing steps 701 to 703.

In an example, that the current integration result meets a first convergence condition includes: Confidence of the current integration result is greater than a confidence threshold. That the current neural network model meets a second convergence condition includes: An iteration quantity of the current neural network model is greater than or equal to the iteration quantity threshold. Certainly, that the current integration result meets a first convergence condition may further include another condition. Similarly, that the current neural network model meets a second convergence condition may also include another condition.

When that the current integration result meets a first convergence condition includes that the confidence of the current integration result is greater than the confidence threshold, after the current integration result is determined based on the current classification result, the confidence of the current integration result may be further determined. An implementation process of determining the confidence of the current integration result includes: determining the largest probability in the current integration result as the confidence of the current integration result; or inputting the target image and the current integration result into a confidence network model, to obtain the confidence that is output by the confidence network model and that is of the current integration result.

The confidence network model may be pre-trained, and the confidence network model may be a neural network model, or certainly may be a model of another structure.

Because the confidence indicates the reliability of the integration result, and in this embodiment of this application, the target image is classified in a cyclic iteration manner, when the confidence of the current integration result is greater than the confidence threshold, or when the current iteration quantity is greater than or equal to the iteration quantity threshold, it indicates that the reliability of the current integration result is high. In this case, the category corresponding to the largest probability in the current integration result may be directly determined as the category of the target image. When the confidence of the current integration result is not greater than the confidence threshold and the current iteration quantity is less than the iteration quantity threshold, it indicates that the reliability of the current integration result is not high. In this case, the neural network model corresponding to the largest probability in the current selection result may be used as the current neural network model, and the target image is reprocessed.

The confidence threshold is preset, and the confidence threshold may be adjusted based on different requirements. Alternatively, the iteration quantity threshold may be preset. The iteration quantity threshold may be a specified iteration quantity, may be a largest iteration quantity, or may be set based on different requirements. This is not limited in this embodiment of this application.

It can be learned from the foregoing method in steps 701 to 703, in this embodiment of this application, the category of the target image is determined in the cyclic iteration manner. A cycle in the cycle iteration manner includes the foregoing steps 701 to 703. In addition, when the current integration result does not meet the first convergence condition and the current neural network model does not meet the second convergence condition, cyclic iteration processing may continue to be performed. In this case, the neural network model corresponding to the largest probability in the current selection result is used as the current neural network model, and the target image is reprocessed based on the foregoing steps, to perform a next cycle in the cycle iteration manner. In other words, a next neural network model can be determined by using a previous neural network model, and classification precision of the next neural network model is higher than classification precision of the previous neural network model. In this way, reliability of the integration result can be gradually improved.

Optionally, for a first cycle in the cyclic iteration manner, the current neural network model is a first neural network model in the m neural network models. In addition, for the foregoing first manner of determining the current integration result, the current integration result obtained in the first cycle is a current classification result output by the first neural network model.

In a second implementation, in step 701, when the target image is processed by using the current neural network model based on the foregoing second implementation, an implementation process of determining the category of the target image based on the current integration result includes two cases. The following separately describes the two cases, and the two cases correspond to the two cases in the second implementation in the foregoing step 701.

In a first case, the category corresponding to the largest probability in the current integration result is determined as the category of the target image.

In the first case, after the target image is processed by using the current neural network model, the current iteration quantity already reaches the iteration quantity threshold. This indicates that reliability of the current integration result is high. Therefore, the category corresponding to the largest probability in the current integration result may be directly determined as the category of the target image, and whether the current integration result meets a first convergence condition does not need to be determined.

In a second case, if the current integration result meets the first convergence condition, the category corresponding to the largest probability in the current integration result is determined as the category of the target image. If the current integration result does not meet a first convergence condition, the neural network model corresponding to the largest probability in the current selection result is used as the current neural network model, and the target image is reprocessed by using the method in the foregoing steps 701 to 703.

In the second case, after the target image is processed by using the current neural network model, the current iteration quantity does not reach the iteration quantity threshold. Reliability of the current integration result is uncertain. Therefore, it needs to be determined whether the current integration result meets the first convergence condition. If the current integration result meets the first convergence condition, it is determined that the reliability of the current integration result is high. Therefore, the category corresponding to the largest probability in the current integration result is determined as the category of the target image. If the current integration result does not meet the first convergence condition, it is determined that the reliability of the current integration result is low. Therefore, the neural network model corresponding to the largest probability in the current selection result is used as the current neural network model, and the target image is reprocessed by using the method in the foregoing steps 701 to 703.

For the first convergence condition in the second implementation, refer to the related description in the first implementation. Details are not described again in this embodiment of this application.

In this embodiment of this application, after the target image is input into the current neural network model, the current neural network model can not only output the current classification result about the target image, but also determine a probability corresponding to a neural network model that is after the current neural network model and that is allowed to be used to process the target image. In addition, a large probability corresponding to the neural network model that is after the current neural network model and that is allowed to be used to process the target image indicates high classification precision of the neural network model for the target image. In addition, usually, classification precision of the neural network model corresponding to the largest probability for the target image is higher than classification precision of the current neural network model for the target image. Therefore, after cyclic iteration processing is performed in this manner, image classification precision can be improved. In other words, in this embodiment of this application, based on a property of the target image, a part of neural network models can be dynamically selected from the m neural network models to perform image classification, and image classification does not need to be performed on each neural network model, thereby reducing an operation amount. In addition, because only the part of neural network models are selected, only parameters of the part of neural network models need to be read into a memory, and parameters of all neural network models do not need to be read into the memory, thereby avoiding a problem of time-consuming memory reading.

The following describes the image classification method provided in this embodiment of this application with reference to two running instances.

Figure 8:
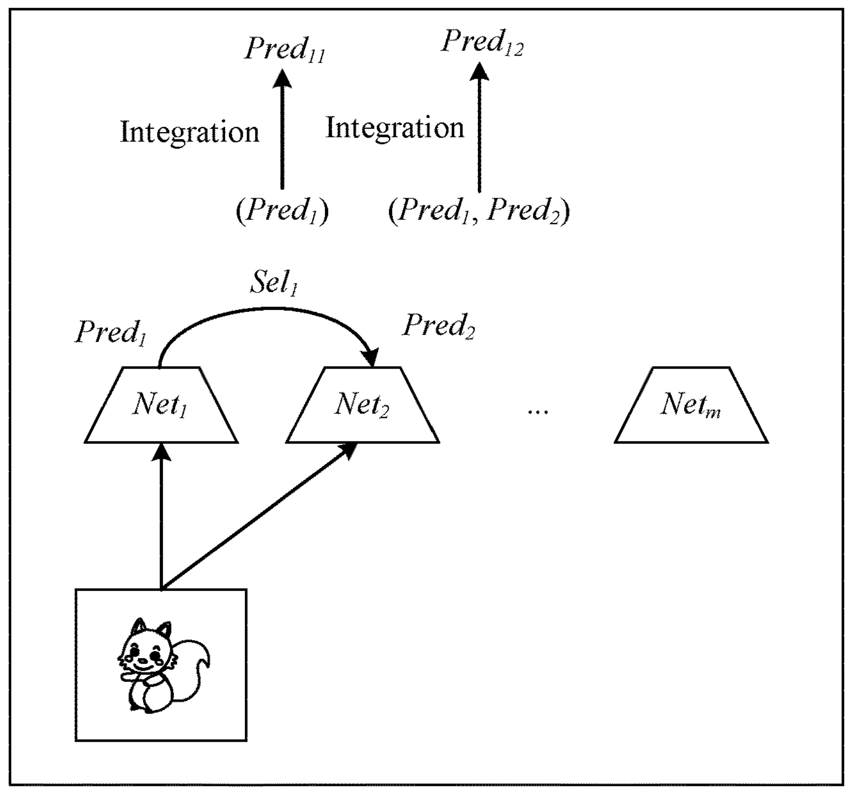
FIG. 8 is a schematic diagram of a running instance according to an embodiment of this application.

Refer to FIG. 8. In a running instance 1, the m neural network models obtained through training are denoted as $Net_1$, $Net_2$, $Net_3$, . . . , and $Net_m$, and the target image is input to $Net_1$, to obtain a classification result $Pred_1$ and a selection result $Sel_1$. The classification result $Pred_1$ is integrated to obtain an integration result $Pred_{11}$, and a current iteration quantity is determined. If confidence of the integration result $Pred_{11}$ is not greater than the confidence threshold and the current iteration quantity is less than the iteration quantity threshold, a neural network model corresponding to a largest probability in the selection result $Sel_1$ is determined. It is assumed that the neural network model corresponding to the largest probability in the selection result $Sel_1$ is $Net_2$. The target image is input into $Net_2$, to obtain a classification result $Pred_2$ and a selection result $Sel_2$. The classification results $Pred_1$ and $Pred_2$ are integrated to obtain an integration result $Pred_{12}$. If confidence of the integration result $Pred_{12}$ is greater than the confidence threshold or the current iteration quantity is greater than or equal to the iteration quantity threshold, a category corresponding to a largest probability in the integration result $Pred_{12}$ is determined as the category of the target image. Otherwise, a neural network model corresponding to a largest probability in the selection result $Sel_2$ continues to be determined, and the foregoing step is repeated, until it is determined that an integration result whose confidence is greater than the confidence threshold is obtained, or that the current iteration quantity is greater than or equal to the iteration quantity threshold.

Figure 9:
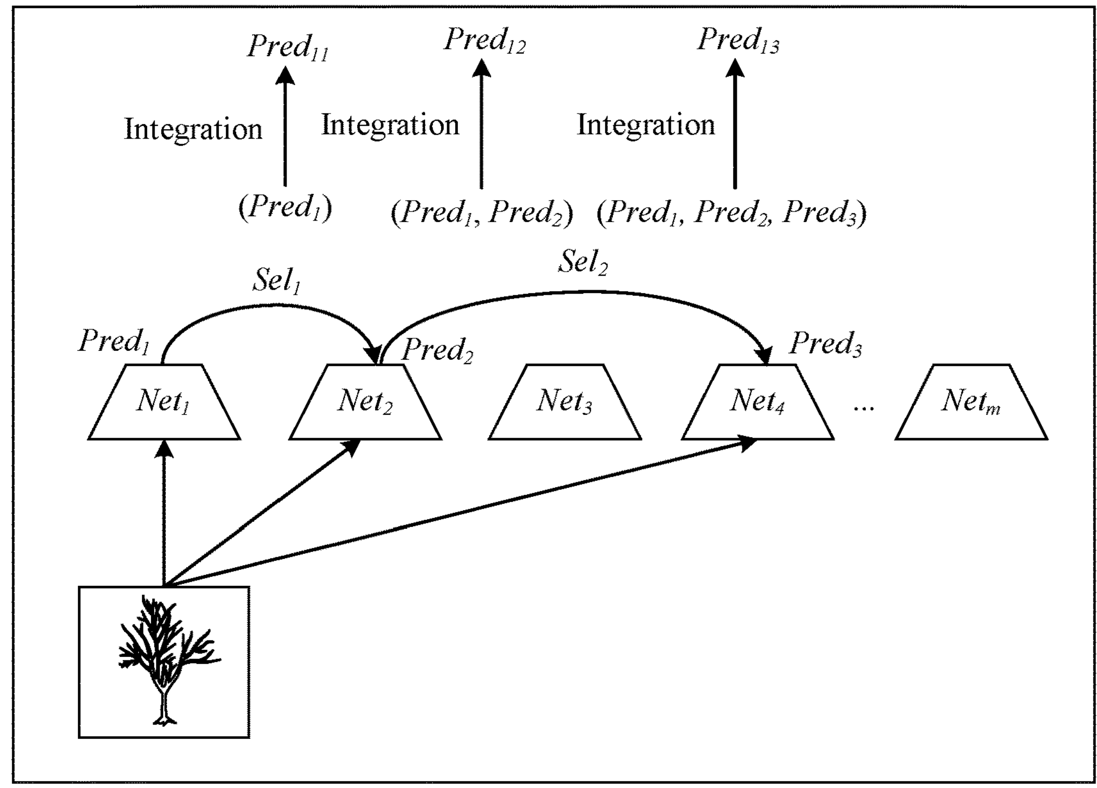
FIG. 9 is a schematic diagram of another running instance according to an embodiment of this application.

Refer to FIG. 9. In a running instance 2, the m neural network models obtained through training are denoted as $Net_1$, $Net_2$, $Net_3$, . . . , and $Net_m$, and the target image is input to $Net_1$, to obtain a classification result $Pred_1$ and a selection result $Sel_1$. The classification result $Pred_1$ is integrated to obtain an integration result $Pred_{11}$, and a current iteration quantity is determined. If confidence of the integration result $Pred_{11}$ is not greater than the confidence threshold and the current iteration quantity is less than the iteration quantity threshold, a neural network model corresponding to a largest probability in the selection result $Sel_1$ is determined. It is assumed that the neural network model corresponding to the largest probability in the selection result $Sel_1$ is $Net_2$. The target image is input into $Net_2$, to obtain a classification result $Pred_2$ and a selection result $Sel_2$. The classification results $Pred_1$ and $Pred_2$ are integrated to obtain an integration result $Pred_{12}$. If confidence of the integration result $Pred_{12}$ is not greater than the confidence threshold and the current iteration quantity is less than the iteration quantity threshold, a neural network model corresponding to a largest probability in the selection result $Sel_2$ is determined. It is assumed that the neural network model corresponding to the largest probability in the selection result $Sel_2$ is $Net_4$. The target image is input into $Net_4$, to obtain a classification result $Pred_3$ and a selection result $Sel_3$. The classification results $Pred_1$, $Pred_2$, and $Pred_3$ are integrated to obtain an integration result $Pred_{13}$. If confidence of the integration result $Pred_{13}$ is greater than the confidence threshold or the current iteration quantity is greater than or equal to the iteration quantity threshold, a category corresponding to a largest probability in the integration result $Pred_{13}$ is determined as the category of the target image. Otherwise, a neural network model corresponding to a largest probability in the selection result $Sel_3$ continues to be determined, and the foregoing step is repeated, until it is determined that an integration result whose confidence is greater than the confidence threshold is obtained, or that the current iteration quantity is greater than or equal to the iteration quantity threshold.

Figure 10:
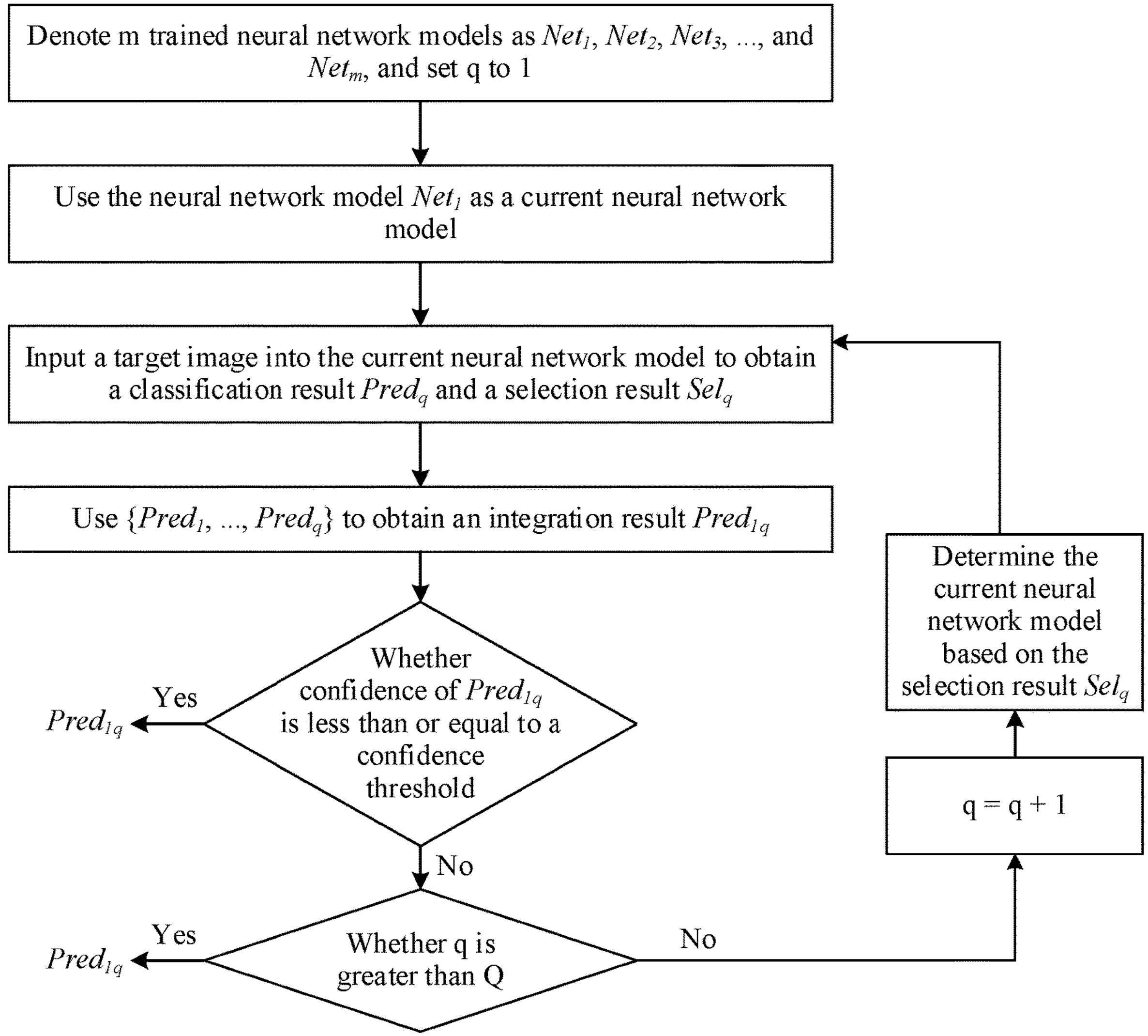
FIG. 10 is a flowchart of an example of an image classification method according to an embodiment of this application.

For example, refer to FIG. 10. The image classification method provided in this embodiment of this application may alternatively be indicated by using FIG. 10. In FIG. 10, q is the current iteration quantity, and Q is the iteration quantity threshold. To be specific, the m trained neural network models are denoted as $Net_1$, $Net_2$, $Net_3$, . . . , and $Net_m$, and q is set to 1. The neural network model $Net_1$ is used as the current neural network model, the target image is input into the current neural network model, to obtain a classification result $Pred_q$ and a selection result $Sel_q$, an integration result $Pred_{1q}$ is obtained by using $\{Pred_1, \ldots, Pred_q\}$, and whether confidence of the integration result $Pred_{1q}$ is greater than the confidence threshold is determined. If the confidence of the integration result $Pred_{1q}$ is greater than the confidence threshold, a category corresponding to a largest probability in the integration result $Pred_{1q}$ is determined as the category of the target image. Otherwise, whether the current iteration quantity q is greater than Q is determined. If the current iteration quantity q is greater than Q, the category corresponding to the largest probability in the integration result $Pred_{1q}$ is determined as the category of the target image. Otherwise, q is set to q+1, a neural network model corresponding to a largest probability in the selection result $Sel_q$ is determined as the current neural network model, and the step of inputting the target image into the current neural network model is returned to.

Figures 11, 12:
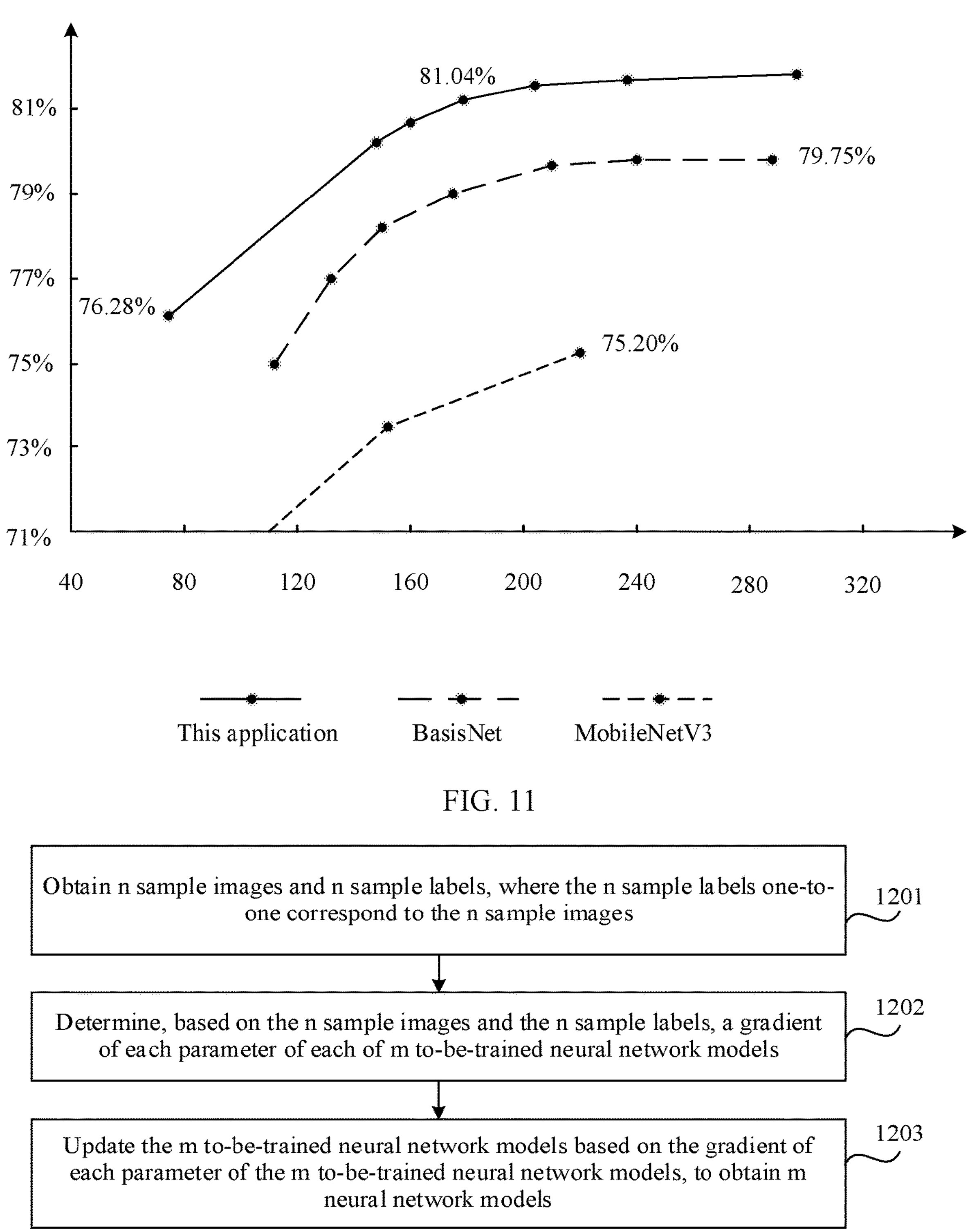
FIG. 11 is a schematic diagram of image classification precision under different calculation amounts according to an embodiment of this application.
FIG. 12 is a flowchart of a neural network model training method according to an embodiment of this application.

When the foregoing confidence threshold is different, the method provided in this embodiment of this application has a different calculation amount. FIG. 11 shows a curve chart of image classification precision under different calculation amounts. In addition, FIG. 11 shows not only a curve of image classification precision under different calculation amounts according to this embodiment of this application, but also curves of image classification precision under different calculation amounts according to other related technologies (BasisNet and MobileNetV3). Through comparison, it can be determined that the method provided in this embodiment of this application has higher image classification precision. In addition, the method provided in this embodiment of this application is verified on the authoritative data set ImageNet in academia. In terms of performance, the method provided in this embodiment of this application far exceeds that of a non-dynamic network algorithm, and a problem of low performance of the non-dynamic network algorithm is overcome. For example, compared with the current mainstream lightweight model MobileNetV3, in this embodiment of this application, a calculation amount is reduced by 2.8 times (that is, from 216 MB to 77 MB), and image classification precision is improved by 1.08% (that is, from 75.2% to 76.28%). In addition, compared with the current mainstream heavyweight model ResNeXt-101, in this embodiment of this application, a calculation amount is reduced by 178 times (that is, from 32 B to 180 MB), and image classification precision basically remains unchanged (that is, from 80.9% to 81.04%).

Optionally, before the target image is classified by using the m neural network models, m to-be-trained neural network models may be further trained, to obtain the m neural network models. Refer to FIG. 12. A process of training the m to-be-trained neural network models includes the following steps.

Step 1201: Obtain n sample images and n sample labels, where the n sample labels one-to-one correspond to the n sample images.

Step 1202: Determine, based on the n sample images and the n sample labels, a gradient of each parameter of each of the m to-be-trained neural network models.

For each of the m to-be-trained neural network models, methods for determining gradients of parameters of each to-be-trained neural network model are the same. The following uses a to-be-trained neural network model k of the m to-be-trained neural network models as an example for description.

In some embodiments, a gradient of each parameter of the to-be-trained neural network model k may be determined based on the following operations: determining, based on the n sample images and the n sample labels, a training function value corresponding to the to-be-trained neural network model k; and determining the gradient of each parameter of the to-be-trained neural network model k based on the training function value corresponding to the to-be-trained neural network model k.

In an example, the training function value corresponding to the to-be-trained neural network model k may be indicated by using the following formula (1) and formula (2):

$$L_k = L_{S_k}(\mathrm{Net}_{k+1}, \ldots, \mathrm{Net}_m) + \sum_{j=1}^{n} \omega_k(j, \mathrm{Net}_1, \ldots, \mathrm{Net}_{k-1}) * L_{Task}(x_j, \mathrm{label}_j) \tag{1}$$

$$L_{S_k} = \sum_{j=1}^{n} \psi_k(j, \mathrm{Net}_{k+1}, \ldots, \mathrm{Net}_m) * L_{CE}[x_j, \mathrm{Label}_k(j, \mathrm{Net}_{k+1}, \ldots, \mathrm{Net}_m)] \tag{2}$$

In the foregoing formula (1), $L_k$ is the training function value corresponding to the to-be-trained neural network model k, and $L_{S_k}$ ($Net_{k+1}$, . . . , $Net_m$) is a model selection function value corresponding to the to-be-trained neural network model k, and may be determined by using a to-be-trained neural network model, in the m to-be-trained neural network models, that is after the to-be-trained neural network model k and that is allowed to process the n sample images. In addition, the model selection function value can enable a selection result output by the to-be-trained neural network model k to allocate an image to a to-be-trained neural network model that is after the to-be-trained neural network model k and that has highest classification precision. In other words, after an image is input into the to-be-trained neural network model k, a to-be-trained neural network model with a highest probability in the selection result output by the to-be-trained neural network model k is the to-be-trained neural network model that is after the to-be-trained neural network model k and that has the highest classification precision.

$\omega_k$ (j, $Net_1$, . . . , $Net_{k-1}$) is a weight function value corresponding to a sample image $x_j$ in the n sample images when the training function value corresponding to the to-be-trained neural network model k is determined, is a real number, and may be determined by using a to-be-trained neural network model, in the m to-be-trained neural network models, that is before the to-be-trained neural network model k and that is allowed to process the n sample images. In addition, the weight function value can enable the to-be-trained neural network model k to have higher classification precision on an image, and reduce classification precision on another image. In other words, when a to-be-trained neural network model for processing an image next time is the to-be-trained neural network model k, the to-be-trained neural network model k has higher classification precision on the image, and has lower classification precision on another image. $L_{Task}$ ($x_j$, $label_j$) is a classification function value corresponding to the sample image $x_j$ in the n sample images when the training function value corresponding to the to-be-trained neural network model k is determined. For example, the classification function value may be a cross-entropy loss function value, or may also be referred to as a task-related function value.

In the foregoing formula (2), $\Psi_k$ (j, $Net_{k+1}$, . . . , $Net_m$) is a selection weight function value corresponding to the sample image $x_j$ in the n sample images when the training function value corresponding to the to-be-trained neural network model k is determined, is a real number, and may be determined by using the to-be-trained neural network model, in the m to-be-trained neural network models, that is after the to-be-trained neural network model k and that is allowed to be used to process the n sample images. $Label_k$ (j, $Net_{k+1}$, . . . , $Net_m$) is a label function value corresponding to the sample image $x_j$ in the n sample images when the training function value corresponding to the to-be-trained neural network model k is determined, is a positive integer, and may be a selection label corresponding to the sample image $x_j$, that is, a label determined for the sample image $x_j$ by using a label function. In addition, the label function value may be determined by using the to-be-trained neural network model, in the m to-be-trained neural network models, that is after the to-be-trained neural network model k and that is allowed to be used to process the n sample images. $L_{CE}$ is a classification loss function value corresponding to the sample image $x_j$ in the n sample images when the training function value corresponding to the to-be-trained neural network model k is determined. For example, the classification loss function value may be a cross-entropy loss function value, and may be determined by using the to-be-trained neural network model, in the m to-be-trained neural network models, that is after the to-be-trained neural network model k and that is allowed to be used to process the n sample images.

It should be noted that the gradient of each parameter of the to-be-trained neural network model k may be determined by using a backpropagation algorithm and based on the training function value corresponding to the to-be-trained neural network model k. The backpropagation algorithm is a supervised learning algorithm. Refer to a conventional technology for using the backpropagation algorithm to determine the gradient of each parameter of the to-be-trained neural network model. Details are not described herein again.

Based on the foregoing description, training function values corresponding to the to-be-trained neural network model k include n classification function values, n weight function values, n label function values, n classification loss function values, and n selection weight function values. The n classification function values one-to-one correspond to the n sample images, the n weight function values one-to-one correspond to the n sample images, the n label function values one-to-one correspond to the n sample images, the n classification loss function values one-to-one correspond to the n sample images, and the n selection weight function values also one-to-one correspond to the n sample images. The following separately describes a process of determining the plurality of function values.

Process of Determining the n Classification Function Values

Because manners of determining a classification function value corresponding to each sample image are the same, one sample image may be selected from the n sample images, and a classification function value corresponding to the selected sample image is determined based on the following operations, until the classification function value corresponding to each sample image is determined: inputting the selected sample image into the to-be-trained neural network model k, to obtain a classification result output by the to-be-trained neural network model k; and determining, based on a sample label corresponding to the selected sample image and the classification result output by the to-be-trained neural network model k, the classification function value corresponding to the selected sample image.

In some embodiments, the classification function value corresponding to the selected sample image is determined according to the following formula (3), and based on a sample label corresponding to the selected sample image and the classification result output by the to-be-trained neural network model k.

$$L_{Task}(x_j, \text{Label}_j) = -\sum_c y_c \log(l_c), \text{ where } y_c = \begin{cases} 1, & \text{if } c = \text{label}_j \\ 0, & \text{else} \end{cases} \tag{3}$$

In the foregoing formula (3), $L_{Task}$ ($x_j$,$label_j$) is the classification function value corresponding to the selected sample image, $x_j$ is the selected sample image, $label_j$ is the sample label corresponding to the selected sample image, $l_c$ is a probability that the sample image selected from the classification result output by the to-be-trained neural network model k belongs to a category c, and $$\sum_c$$

is summation processing of y log (l) corresponding to all probabilities in the classification result output by the to-be-trained neural network model k.

For example, the classification result output by the to-be-trained neural network model k includes five probabilities, and each probability is a probability that the selected sample image belongs to one of the five categories. In this case, y corresponding to each category may be determined based on the five categories and the sample label corresponding to the selected sample image. Then, summation processing is performed in the foregoing manner based on y respectively corresponding to the five categories and the probability corresponding to each category in the classification result output by the to-be-trained neural network model k, to obtain the classification function value corresponding to the selected sample image.

Process of Determining the n Weight Function Values

In this embodiment of this application, the n weight function values may be implemented based on a rule, or may be implemented based on meta-learning. The following separately describes the two implementations.

In a first implementation, the n weight function values are implemented based on the rule. After the n weight function values are determined by using this implementation, when a to-be-trained neural network model that is before the to-be-trained neural network model k and that is allowed to be used to process an image determines that a to-be-trained neural network model used to process the image next time is the to-be-trained neural network model k, the to-be-trained neural network model k has a high weight function value on the image.

In the first implementation, the n weight function values may be determined based on the n sample images and the n sample labels by using the following steps (11) to (13).

(11) Determine, by using b to-be-trained neural network models, a standard probability, of each of the n sample images, that each oft to-be-trained neural network models is used to process, to obtain n*t standard probabilities, where t=m−b, the b to-be-trained neural network models are models, in the m to-be-trained neural network models, that are before the to-be-trained neural network model k and that are allowed to be used to process the n sample images, and the t to-be-trained neural network models include the to-be-trained neural network model k, and the model, in the m to-be-trained neural network models, that is after the to-be-trained neural network model k and that is allowed to be used to process the n sample images.

In some embodiments, an average probability, of each of the n sample images, that each of the t to-be-trained neural network models is used to process may be determined by using the b to-be-trained neural network models, to obtain n*t average probabilities. Average probabilities that are in the n*t average probabilities and that correspond to a same to-be-trained neural network model in the t to-be-trained neural network models are divided into a probability set, to obtain t probability sets. Standardization processing is performed on the n*t average probabilities based on the n*t average probabilities and the t probability sets, to obtain the n*t standard probabilities.

Manners of determining, by using the b to-be-trained neural network models, the average probability, of each of the n sample images, that each of the t to-be-trained neural network models is used to process are the same. Therefore, one sample image is selected from the n sample images, one to-be-trained neural network model is selected from the t to-be-trained neural network models, and the average probability, of the selected sample image, that the selected to-be-trained neural network model is used to process is determined by using the b to-be-trained neural network models and based on the following operations, until the n*t average probabilities are determined: determining, by using each of the b to-be-trained neural network models, a probability, of the selected sample image, that the selected to-be-trained neural network model is used to process, to obtain b probabilities; and determining an average value of the b probabilities, to obtain the average probability, of the selected sample image, that the selected to-be-trained neural network model is used to process.

In an example, for each of the b to-be-trained neural network models, the selected sample image may be input into the to-be-trained neural network model, to obtain a selection result output by the to-be-trained neural network model. The selection result includes a probability, of the selected sample image, that the selected to-be-trained neural network model is used to process, that is, a probability that a next neural network model that classifies the selected sample image is the selected to-be-trained neural network model. In this way, for each of the b to-be-trained neural network models, the probability, of the selected sample image, that the selected to-be-trained neural network model is used to process can be obtained, to obtain the b probabilities. The average value of the b probabilities may be determined, and the average value of the b probabilities is determined as the average probability, of the selected sample image, that the selected to-be-trained neural network model is used to process.

Manners of performing standardization processing on each average probability in each probability set in the t probability sets are the same. Therefore, a probability set may be selected from the t probability sets, and standardization processing is performed on each average probability in the selected probability set based on the following operations, until the n*t standard probabilities are determined: determining a mean value and a standard deviation of average probabilities in the selected probability set; and determining, based on the average probabilities in the selected probability set, the average value, and the standard deviation, a standard probability corresponding to each average probability in the selected probability set.

In an example, the standard probability corresponding to each average probability in the selected probability set is determined according to the following formula (4), and based on the average probabilities in the selected probability set, the average value, and the standard deviation.

$$\tilde{P_{j,h}} = \frac{P_{j,h} - \mathrm{Mean}(\Omega_h)}{Std(\Omega_h)} \quad (4)$$

In the formula (4), $P_{j,h}$ is an average probability in the selected probability set, $\tilde{P}_{j,h}$ is a standard probability corresponding to the average probability $P_{j,h}$ in the selected probability set, $\Omega_h$ is the selected probability set, $\mathrm{Mean}(\Omega_h)$ is an average value of the selected probability set, and Std $(\Omega_h)$ is the standard deviation of the selected probability set.

(12) Determine, based on the n*t standard probabilities, a first weight corresponding to each of the n sample images.

In some embodiments, the first weight corresponding to each of the n sample images may be determined by using the following steps (a) to (g).

(a) Form a standard probability set by using the n*t standard probabilities, and determine a relative probability value corresponding to each standard probability in the standard probability set.

In some embodiments, a standard probability is selected from the standard probability set, and a relative probability value corresponding to the selected standard probability is determined based on the following operations, until a relative probability value corresponding to each standard probability is determined: determining, from other standard probabilities other than the selected standard probability in the standard probability set, a plurality of standard probabilities corresponding to a same sample image as the selected standard probability; determining a largest standard probability in the plurality of standard probabilities; and determining a difference between the selected standard probability and the largest standard probability as the relative probability value corresponding to the selected standard probability.

A method for determining the relative probability value corresponding to each standard probability in the standard probability set may be indicated by using the following formula (5).

$$\bar{\bar{P}}_{j,h}=\tilde{P}_{j,h}-\tilde{P}_{max} \tag{5}$$

In the foregoing formula (5), $\bar{\bar{P}}_{j,h}$ is a probability relative value corresponding to a standard probability $\tilde{P}_{j,h}$, and $\tilde{P}_{max}$ is a largest standard probability, in the standard probability set, that is in other standard probabilities other than the standard probability $\tilde{P}_{j,h}$ and that is in a plurality of standard probabilities corresponding to a same sample image as the standard probability $\tilde{P}_{j,h}$.

(b) Determine a largest relative probability value from relative probability values corresponding to the standard probabilities in the standard probability set.

The relative probability values corresponding to the standard probabilities in the standard probability set are compared, to determine the largest relative probability value in the relative probability values.

(c) Determine, from the n sample images, a sample image corresponding to the largest relative probability value, and determine, from the t to-be-trained neural network models, a to-be-trained neural network model corresponding to the largest relative probability value.

Because the n*t standard probabilities are determined by using the b to-be-trained neural network models, where the standard probability is of each of the n sample images, and is processed by each of the t to-be-trained neural network models, and the standard probability set includes the n*t standard probabilities, one standard probability in the standard probability set corresponds to one sample image in the n sample images, and corresponds to one to-be-trained neural network model in the t to-be-trained neural network models. The relative probability value is determined based on the standard probabilities. Therefore, each relative probability value also corresponds to one sample image in the n sample images, and corresponds to one to-be-trained neural network model in the t to-be-trained neural network models. In this way, after the largest relative probability value is determined, the sample image corresponding to the largest relative probability value is determined from the n sample images, and the to-be-trained neural network model corresponding to the largest relative probability value is determined from the t to-be-trained neural network models.

(d) Determine, based on the to-be-trained neural network model corresponding to the largest relative probability value, a first weight of a sample image corresponding to the largest relative probability value.

In some embodiments, if the to-be-trained neural network model corresponding to the largest relative probability value is the to-be-trained neural network model k, the first weight of the sample image corresponding to the largest relative probability value is determined to be $$a+\frac{1-a}{t}.$$

If the to-be-trained neural network model corresponding to the largest relative probability value is not the to-be-trained neural network model k, the first weight of the sample image corresponding to the largest relative probability value is determined to be $$\frac{1-a}{t}.$$

α is a set real number, and meets a≥0, and a≤1.

(e) Remove, from the standard probability set, a standard probability corresponding to the sample image corresponding to the largest relative probability value.

Because the n*t standard probabilities are determined by using the b to-be-trained neural network models, where the standard probability is of each of the n sample images, and is processed by each of the t to-be-trained neural network models, one sample image corresponds to t standard probabilities. In this way, after the sample image corresponding to the largest relative probability value is determined, the t standard probabilities corresponding to the sample image may be removed from the standard probability set. In this case, the standard probability set further has n*(t−1) standard probabilities.

(f) If the standard probability set is not null after the removal, update a model determining quantity, where the model determining quantity is a quantity of times of determining, from the t to-be-trained neural network models, the to-be-trained neural network model corresponding to the largest relative probability value.

In an example, the model determining quantity may be increased by 1. To be specific, each time a largest relative probability value is determined in one cycle, and a to-be-trained neural network model corresponding to the largest relative probability value is determined from the t to-be-trained neural network models, the model determining quantity may be increased by 1. Certainly, this is only an example of an update manner, and may be another manner.

Further, if the standard probability set after the removal is null, the operation ends. In this case, the first weight corresponding to each of the n sample images has been determined and obtained.

(g) If the updated model determining quantity is greater than or equal to n/t, remove, from the standard probability set, a standard probability corresponding to the to-be-trained neural network model corresponding to the largest relative probability value, and return to step (a) to determine the relative probability value corresponding to each standard probability in the standard probability set.

Because the n*t standard probabilities are determined by using the b to-be-trained neural network models, where the standard probability is of each of the n sample images, and is processed by each of the t to-be-trained neural network models, one of the t to-be-trained neural network models corresponds to n standard probabilities. In this way, n standard probabilities corresponding to the to-be-trained neural network model corresponding to the largest relative probability value may be removed from the standard probability set. In this case, there are still (n−1)*(t−1) standard probabilities in the standard probability set.

(13) Perform normalization processing on the first weight corresponding to each of the n sample images, to obtain the weight function value corresponding to each of the n sample images.

In some embodiments, normalization processing may be performed, according to the following formula (6), on the first weight corresponding to each of the n sample images, to obtain the weight function value corresponding to each of the n sample images.

$$\omega_j = \frac{\tilde{\omega}_j}{\sum_{g=1}^{n} \tilde{\omega}_g} \quad (6)$$

In the foregoing formula (6), $\omega_j$ is a weight function value corresponding to the sample image $x_j$, $\tilde{\omega}_j$ is a first weight corresponding to the sample image $x_j$, and $\tilde{\omega}_g$ is a first weight corresponding to a g-th sample image in the n sample images.

In a second implementation, the n weight function values are implemented based on meta-learning. After the n weight function values are determined in this implementation, the to-be-trained neural network model k can have a low classification loss on some images.

In the second implementation, the n weight function values may be determined based on the n sample images and the n sample labels by using the following steps (21) to (27).

(21) Select, from the n sample images by using b to-be-trained neural network models, h sample images that are processed by the to-be-trained neural network model k next time, where the b to-be-trained neural network models are models, in the m to-be-trained neural network models, that are before the to-be-trained neural network model k and that are allowed to be used to process the n sample images, and h is less than n.

In some embodiments, one sample image is selected from the n sample images, and one to-be-trained neural network model is selected from the b to-be-trained neural network models. The selected sample image is input into the selected to-be-trained neural network model, to obtain a selection result output by the selected to-be-trained neural network model. The selection result includes a probability corresponding to a to-be-trained neural network model, in the m to-be-trained neural network models, that is after the selected to-be-trained neural network model and that is allowed to be used to process the selected sample image. If a to-be-trained neural network model corresponding to a largest probability in the selection result is the to-be-trained neural network model k, the selected sample image is determined as a sample image processed by the to-be-trained neural network model k next time. All sample images and each of the b to-be-trained neural network models are traversed by using the foregoing method, to obtain the h sample images.

(22) Determine, by using a meta network model, a prediction weight corresponding to each of the n sample images.

In some embodiments, each sample image in the n sample images may be input into the meta network model, to obtain a prediction weight corresponding to a corresponding sample image output by the meta network model. To be specific, for any sample image in the n sample images, after the sample image is input into the meta network model, a prediction weight that is output by the meta network model and that corresponds to the sample image may be obtained.

The meta network model may be a pre-trained model. This is not limited in this embodiment of this application.

(23) Determine a weighted loss value of the n sample images based on a prediction weight corresponding to each of the n sample images and a classification function value corresponding to each of the n sample images.

In an example, the weighted loss value of the n sample images is determined according to the following formula (7), and based on the prediction weight corresponding to each of the h sample images and the classification function value corresponding to each of the n sample images.

$$L_{train} = \sum_{g=1}^{n} \overline{\omega_g} * L_{Task}(x_g, \text{label}_g) \quad (7)$$

In the formula (7), $L_{train}$ is the weighted loss value of the n sample images, $\overline{\omega}_g$ is a prediction weight corresponding to a g-th sample image in the n sample images, and $L_{Task}(x_g, \text{label}_g)$ is a classification function value corresponding to the g-th sample image in the n sample images.

(24) Update the to-be-trained neural network model k based on the weighted loss value of the n sample images.

In some embodiments, the to-be-trained neural network model k may be updated based on the weighted loss value of the n sample images by using a backpropagation algorithm. For a manner of updating the to-be-trained neural network model k by using the backpropagation algorithm, refer to a conventional technology. This is not limited in this embodiment of this application.

(25) Input the selected h sample images into the updated to-be-trained neural network model k, to obtain a total loss value of the updated to-be-trained neural network model k on the h sample images.

(26) Update the meta network model based on the total loss value of the updated to-be-trained neural network model k on the h sample images.

In some embodiments, the meta network model may be updated based on the total loss value of the updated to-be-trained neural network model k on the h sample images and by using a backpropagation algorithm. For a manner of updating the meta network model by using the backpropagation algorithm, refer to a conventional technology. This is not limited in this embodiment of this application.

(27) Determine, by using the updated meta network model, the weight function value corresponding to each of the n sample images.

In some embodiments, each sample image in the n sample images may be input into the updated meta network model, to obtain a weight function value that is output by the updated meta network model and that corresponds to the corresponding sample image. To be specific, for any sample image in the n sample images, after the sample image is input into the updated meta network model, a weight function value that is output by the updated meta network model and that corresponds to the sample image may be obtained.

The foregoing manner of determining the n weight function values is only one of meta learning-based manners. In actual application, there is another meta learning-based manner. For example, the n weight function values may be determined based on the n sample images and the n sample labels by using the following steps (31) to (37).

(31) Select, from the n sample images by using b to-be-trained neural network models, h sample images that are processed by the to-be-trained neural network model k next time, where the b to-be-trained neural network models are models, in the m to-be-trained neural network models, that are before the to-be-trained neural network model k and that are allowed to be used to process the n sample images, and h is less than n.

For an implementation process of step (31), refer to the implementation process of step (21). Details are not described herein again.

(32) Determine an initial weight corresponding to each of the n sample images.

In some embodiments, an initial weight may be set for each of the h sample images. For example, the initial weight may be 0.

(33) Determine a weighted loss value of the n sample images based on the initial weight corresponding to each of the n sample images.

In an example, the weighted loss value of the n sample images is determined according to the following formula (8), and based on the initial weight corresponding to each of the n sample images and the classification function value corresponding to each of the n sample images.

$$L_{train} = \sum_{g=1}^{n} \overline{\overline{\omega_g}} * L_{Task}(x_g, \text{label}_g) \tag{8}$$

In the formula (8), $L_{train}$ is the weighted loss value of the n sample images, $\overline{\omega}_g$ is an initial weight corresponding to a g-th sample image in the n sample images, and $L_{Task}(x_g, \text{label}_g)$ is a classification function value corresponding to the g-th sample image in the n sample images.

(34) Update the to-be-trained neural network model k based on the weighted loss value of the n sample images.

In some embodiments, the to-be-trained neural network model k may be updated based on the weighted loss value of the n sample images by using a backpropagation algorithm. For a manner of updating the to-be-trained neural network model k by using the backpropagation algorithm, refer to a conventional technology. This is not limited in this embodiment of this application.

(35) Input the selected h sample images into the updated to-be-trained neural network model k, to obtain a total loss value of the updated to-be-trained neural network model k on the h sample images.

(36) Determine, based on the total loss value of the updated to-be-trained neural network model k on the h sample images and the initial weight corresponding to each of the n sample images, a second weight corresponding to each of the n sample images.

In an example, a second weight corresponding to each of the n sample images is determined according to the following formula (9), and based on the total loss value of the updated to-be-trained neural network model k on the h sample images and the initial weight corresponding to each of the n sample images.

$$\nabla\tilde{\omega}_j = \max\left(-\frac{\partial \tilde{L_{val}}}{\partial \overline{\overline{\omega_j}}}, 0\right) \tag{9}$$

In the formula (9), $\Delta\tilde{\omega}_j$ is a second weight corresponding to the sample image $x_j$ in the n sample images, $\tilde{L}_{val}$ is the total loss value of the updated to-be-trained neural network model k on the h sample images, and $$\frac{\partial \tilde{L_{val}}}{\partial \overline{\overline{\omega_j}}}$$

is a gradient of the total loss value of the updated to-be-trained neural network model k on the h sample images to the initial weight of the sample image $x_j$.

(37) Perform normalization processing on the second weight corresponding to each of the n sample images, to obtain the weight function value corresponding to each of the n sample images.

In an example, normalization processing is performed, according to the following formula (10), on the second weight corresponding to each of the n sample images, to obtain the weight function value corresponding to each of the n sample images.

$$\omega_j = \frac{\nabla\tilde{\omega}_j}{\sum_{g=1}^{n}\nabla\tilde{\omega}_g} \tag{10}$$

In the foregoing formula (10), $\omega_j$ is a weight function value corresponding to the sample image $x_j$, $\Delta\tilde{\omega}_j$ is a second weight corresponding to the sample image $x_j$, and $\Delta\tilde{\omega}_g$ is a second weight corresponding to a g-th sample image in the n sample images.

Process of Determining the n Label Function Values

In this embodiment of this application, a label function value corresponding to a sample image is related to accuracy of a classification result that a to-be-trained neural network model that is after the to-be-trained neural network model k and that is allowed to be used to process the sample image has on the sample image. In other words, if a to-be-trained neural network model is used to determine the label function value corresponding to the sample image, accuracy of a classification result that the to-be-trained neural network model has on the sample image is high, and accuracy of a classification result that another to-be-trained neural network model has on the sample image is low. The n label function values may be determined based on the n sample images and the n sample labels by using the following steps (41) and (42).

(41) Determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images.

In some embodiments, a probability, of a corresponding sample label, to which each of the n sample images belongs is determined by using each of the s to-be-trained neural network models, to obtain n*s probabilities. Average probabilities that are in the n*s probabilities and that correspond to a same to-be-trained neural network model in the s to-be-trained neural network models are divided into a probability set, to obtain s probability sets. Standardization processing is performed on the n*s probabilities based on the n*s probabilities and the s probability sets, to obtain the n*s standard probabilities.

Manners of determining, by each of the s to-be-trained neural network models, a standard probability, of a corresponding sample label, to which each of the n sample images belongs are the same. Therefore, one to-be-trained neural network model may be selected from the s to-be-trained neural network models, one sample image may be selected from the n sample images, and a probability, of a corresponding sample label, to which the selected sample image belongs is determined by using the selected to-be-trained neural network model and based on the following operation, until the n*s probabilities are determined: inputting the selected sample image into the selected to-be-trained neural network model, to obtain a classification result output by the selected to-be-trained neural network model, where the classification result includes a probability that the selected sample image belongs to each of the plurality of categories. The plurality of categories may include a sample label corresponding to the selected sample image. In this way, the probability, of the corresponding sample label, to which the selected sample image belongs may be determined by using the selected to-be-trained neural network model.

A manner of performing standardization processing on the n*s probabilities based on the n*s probabilities and the s probability sets is similar to the manner of performing standardization processing on the n*t average probabilities based on the n*t average probabilities and the t probability sets. Details are not described again in this embodiment of this application.

(42) Determine, based on the n*s standard probabilities, the label function value corresponding to each of the n sample images.

In some embodiments, the n*s standard probabilities may be used to form a standard probability set, and a relative probability value corresponding to each standard probability in the standard probability set is determined. A largest relative probability value is determined from relative probability values corresponding to standard probabilities in the standard probability set, a sample image corresponding to the largest relative probability value is determined from the n sample images, and a to-be-trained neural network model corresponding to the largest relative probability value is determined from the s to-be-trained neural network models. A location number of the to-be-trained neural network model that corresponds to the largest relative probability value and that is in the s to-be-trained neural network models is determined as a label function value of the sample image corresponding to the largest relative probability value. A standard probability corresponding to the sample image corresponding to the largest relative probability value is removed from the standard probability set. If the standard probability set is not null after the removal, a model determining quantity is updated, where the model determining quantity is a quantity of times of determining, from the s to-be-trained neural network models, the to-be-trained neural network model corresponding to the largest relative probability value. If the updated model determining quantity is greater than or equal to n/s, a standard probability corresponding to the to-be-trained neural network model corresponding to the largest relative probability value is removed from the standard probability set, and the step of determining the relative probability value corresponding to each standard probability in the standard probability set is returned to.

For example, after the largest relative probability value is determined from the relative probability values corresponding to the standard probabilities in the standard probability set, the sample image that is determined from the n sample images and that corresponds to the largest relative probability value is a sample image 5, and the to-be-trained neural network model that is determined from the s to-be-trained neural network models and that corresponds to the largest relative probability value is an eighth to-be-trained neural network model. Therefore, a label function value of the sample image 5 may be determined to be 30.

For content in the foregoing implementation, refer to the related description in the foregoing step (12). Details are not described herein again.

Process of Determining the n Classification Loss Function Values

Because manners of determining a classification loss function value corresponding to each sample image are the same, one sample image may be selected from the n sample images, and a classification loss function value corresponding to the selected sample image is determined based on the following operations, until the classification loss function value corresponding to each sample image is determined: determining, by using the to-be-trained neural network model k, a probability, of the selected sample image, that each of the s to-be-trained neural network models is used to process, to obtain s probabilities; and determining, based on a label function value corresponding to the selected sample image and the s probabilities, the classification loss function value corresponding to the selected sample image.

In some embodiments, the selected sample image may be input into the to-be-trained neural network model k, to obtain a selection result output by the to-be-trained neural network model k. The selection result includes a probability, of the selected sample image, that each of the s to-be-trained neural network models is used to process, that is, a probability that a next neural network model that classifies the selected sample image is each of the s to-be-trained neural network models; and the s probabilities are obtained.

In some embodiments, the classification loss function value corresponding to the selected sample image may be determined according to the following formula (11), and based on the label function value corresponding to the selected sample image and the s probabilities.

$$L_{CE}(x_j, L^*) = -\sum_e y_e \log(r_e), \text{ where } y_c = \begin{cases} 1, & \text{if } e = L^* \\ 0, & \text{else} \end{cases} \quad (11)$$

In the foregoing formula (11), L* is a label function value corresponding to the selected sample image $x_j$, $L_{CE}(x_j, L^*)$ is a classification loss function value corresponding to the selected sample image, $r_e$ is a probability that is in the s probabilities output by the to-be-trained neural network model k and that the selected sample image belongs to a category e, and $$\sum_e$$

is summation processing of y log (l) corresponding to the s probabilities output by the to-be-trained neural network model k.

Process of Determining the n Selection Weight Function Values

In this embodiment of this application, a selection weight function value corresponding to a sample image is related to a variance of accuracy of a classification result that a to-be-trained neural network model that is after the to-be-trained neural network model k and that is allowed to be used to process the n sample images has on the sample image. To be specific, a large variance of accuracy of a classification result that the to-be-trained neural network model that is after the to-be-trained neural network model k and that is allowed to be used to process the n sample images has on a sample image indicates a large selection weight function value corresponding to the sample image. A small variance of accuracy of a classification result that the to-be-trained neural network model that is after the to-be-trained neural network model k and that is allowed to be used to process the n sample images has on a sample image indicates a small selection weight function value corresponding to the sample image.

In some embodiments, a standard probability, of a corresponding sample label, to which each of the n sample images belongs is determined by using each of the s to-be-trained neural network models, to obtain n*s standard probabilities. The selection weight function value corresponding to each of the n sample images is determined based on the n*s standard probabilities.

For an implementation process of determining, by using each of the s to-be-trained neural network models, the standard probability, of the corresponding sample label, to which each of the n sample images belongs is determined, refer to the description in the foregoing step (41). Details are not described herein again.

An implementation process of determining, based on the n*s standard probabilities, the selection weight function value corresponding to each of the n sample images includes: dividing probabilities that are in the n*s standard probabilities and that correspond to a same sample image in the n sample images into one probability set, to obtain n probability sets; determining a standard deviation of standard probabilities included in each of the n probability sets, to obtain n standard deviations; and performing normalization processing on each of the n standard deviations, to obtain the selection weight function value corresponding to each of the n sample images.

A manner of performing normalization processing on each of the n standard deviations is similar to a manner of performing normalization processing on the first weight corresponding to each of the n sample images in step (13). Details are not described again in this embodiment of this application.

Step 1203: Update the m to-be-trained neural network models based on the gradient of each parameter of the m to-be-trained neural network models, to obtain m neural network models.

For each of the m to-be-trained neural network models, the to-be-trained neural network model is updated by using a gradient descent algorithm based on the gradient of each parameter of the to-be-trained neural network model, to obtain a neural network model. After each to-be-trained neural network model is updated by using the gradient descent algorithm, the m neural network models may be obtained.

It should be noted that for a method for updating the m to-be-trained neural network models by using the gradient descent algorithm, refer to a conventional technology. Details are not described herein again. For example, the gradient descent algorithm may be a stochastic gradient descent (SGD) algorithm.

Figure 13:
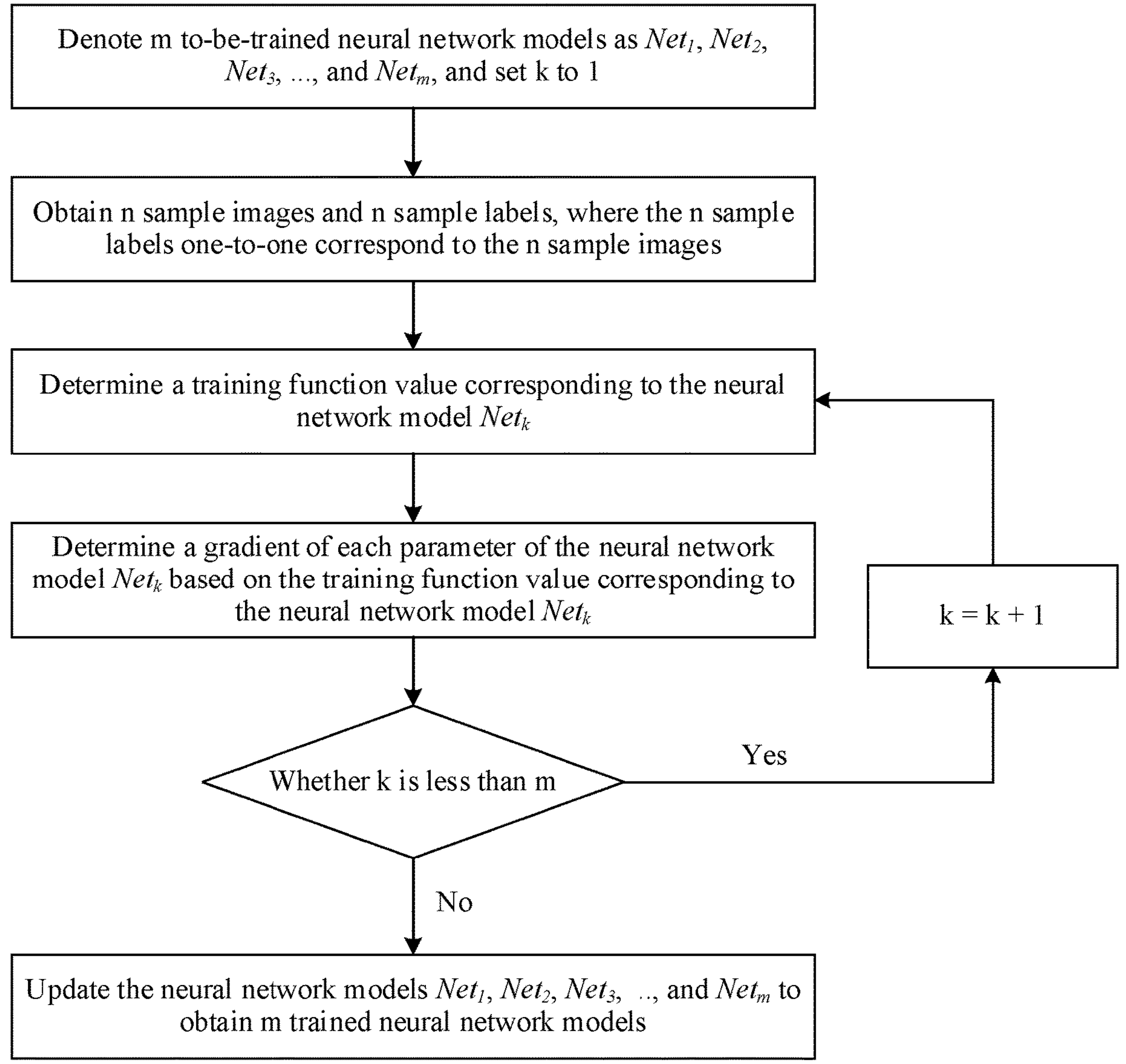
FIG. 13 is a flowchart of an example of a neural network model training method according to an embodiment of this application.

For example, refer to FIG. 13. The neural network model training method provided in this embodiment of this application may alternatively be indicated by using FIG. 13. The m to-be-trained neural network models are denoted as $Net_1$, $Net_2$, $Net_3$, . . . , and $Net_m$, and k is set to 1. The n sample images and the n sample labels are obtained, where the n sample labels one-to-one correspond to the n sample images. A training function value corresponding to the neural network model $Net_k$ is determined. A gradient of each parameter of the neural network model $Net_k$ is determined based on the training function value corresponding to the neural network model $Net_k$. It is determined whether k is less than m, and if k is not less than m, the neural network models $Net_1$, $Net_2$, $Net_3$, . . . , and $Net_m$ are updated to obtain the m trained neural network models. If k is less than m, k is set to k+1, and the step of determining the training function value corresponding to the neural network model $Net_k$ is returned to.

Figure 14:
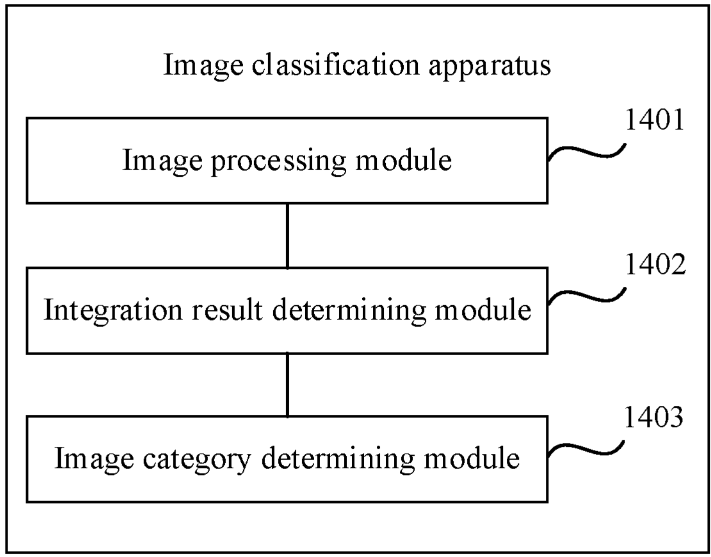
FIG. 14 is a schematic diagram of a structure of an image classification apparatus according to an embodiment of this application.

FIG. 14 is a schematic diagram of a structure of an image classification apparatus according to an embodiment of this application. The image classification apparatus may be implemented by software, hardware, or a combination of software and hardware to become a part or an entirety of a computer device. The computer device may be the terminal or the server shown in FIG. 1. Refer to FIG. 14. The apparatus includes: an image processing module 1401, an integration result determining module 1402, and an image category determining module 1403.

The image processing module 1401 is configured to process a to-be-classified target image by using a current neural network model, to obtain a current classification result output by the current neural network model.

The current classification result includes a probability that the target image belongs to each of a plurality of categories, the current neural network model is a neural network model i corresponding to a largest probability in a selection result output by a neural network model a, the selection result output by the neural network model a includes probabilities corresponding to p neural network models in m trained neural network models, the p neural network models are neural network models that are after the neural network model a and that are allowed to be used to process the target image, the p neural network models include the neural network model i, the m neural network models include the neural network model a, m is an integer greater than 1, p is an integer greater than or equal to 1, and p is less than m.

The integration result determining module 1402 is configured to determine a current integration result based on the current classification result, where the current integration result includes an integrated probability that the target image belongs to each of the plurality of categories.

The image category determining module 1403 is configured to determine a category of the target image based on the current integration result.

Optionally, a probability of a first category in the current integration result includes an average value of probabilities of the first category in a plurality of classification results, where the first category is one of the plurality of categories, and the plurality of classification results include the classification result output by the neural network model a and the classification result output by the neural network model i.

Alternatively, a probability of a first category in the current integration result includes a probability of the first category in the classification result output by the neural network model i.

Optionally, the image category determining module 1403 is specifically configured to determine a category corresponding to a largest probability in the current integration result as the category of the target image.

Alternatively, the current neural network model further outputs a current selection result, the current selection result includes probabilities corresponding to d neural network models in the m neural network models, the d neural network models are neural network models that are after the neural network model i and that are allowed to be used to process the target image, d is an integer greater than or equal to 1, and d is less than m. The image category determining module 1403 is specifically configured to: if the current integration result meets a first convergence condition or the current neural network model meets a second convergence condition, determine a category corresponding to a largest probability in the current integration result as the category of the target image.

Optionally, that the current integration result meets a first convergence condition includes: Confidence of the current integration result is greater than a confidence threshold.

Optionally, the apparatus further includes:

a first confidence determining module, configured to determine the largest probability in the current integration result as the confidence of the current integration result; or a second confidence determining module, configured to input the target image and the current integration result into a confidence network model, to obtain the confidence that is output by the confidence network model and that is of the current integration result.

Optionally, that the current neural network model meets a second convergence condition includes: An iteration quantity of the current neural network model is greater than or equal to an iteration quantity threshold.

Optionally, the apparatus further includes:

a sample obtaining module, configured to obtain n sample images and n sample labels, where the n sample labels one-to-one correspond to the n sample images;

a gradient determining module, configured to determine, based on the n sample images and the n sample labels, a gradient of each parameter of each of m to-be-trained neural network models; and a model update module, configured to update the m to-be-trained neural network models based on the gradient of each parameter of the m to-be-trained neural network models, to obtain m trained neural network models.

Optionally, the gradient determining module includes:

determining a gradient of each parameter of a to-be-trained neural network model k in the m to-be-trained neural network models based on the following modules, until the gradient of each parameter of each to-be-trained neural network model is determined:

a function value determining submodule, configured to determine, based on the n sample images and the n sample labels, a training function value corresponding to the to-be-trained neural network model k; and a gradient determining submodule, configured to determine the gradient of each parameter of the to-be-trained neural network model k based on the training function value corresponding to the to-be-trained neural network model k.

Optionally, the training function value includes n classification function values, and the n classification function values one-to-one correspond to the n sample images.

The function value determining submodule is specifically configured to:

select one sample image from the n sample images, and determine, based on the following operations, a classification function value corresponding to the selected sample image, until a classification function value corresponding to each sample image is determined:

inputting the selected sample image into the to-be-trained neural network model k, to obtain a classification result output by the to-be-trained neural network model k; and determining, based on a sample label corresponding to the selected sample image and the classification result output by the to-be-trained neural network model k, the classification function value corresponding to the selected sample image.

Optionally, the training function value includes n weight function values, and the n weight function values one-to-one correspond to the n sample images.

The function value determining submodule is specifically configured to:

determine, by using b to-be-trained neural network models, a standard probability, of each of the n sample images, that each oft to-be-trained neural network models is used to process, to obtain n*t standard probabilities, where t=m−b, the b to-be-trained neural network models are models, in the m to-be-trained neural network models, that are before the to-be-trained neural network model k and that are allowed to be used to process the n sample images, and the t to-be-trained neural network models include the to-be-trained neural network model k, and the model, in the m to-be-trained neural network models, that is after the to-be-trained neural network model k and that is allowed to be used to process the n sample images;

determine, based on the n*t standard probabilities, a first weight corresponding to each of the n sample images; and perform normalization processing on the first weight corresponding to each of the n sample images, to obtain the weight function value corresponding to each of the n sample images.

Optionally, the function value determining submodule is specifically configured to:

determine, by using the b to-be-trained neural network models, an average probability, of each of the n sample images, that each of the t to-be-trained neural network models is used to process, to obtain n*t average probabilities;

divide average probabilities that are in the n*t average probabilities and that correspond to a same to-be-trained neural network model in the t to-be-trained neural network models into a probability set, to obtain t probability sets; and perform standardization processing on the n*t average probabilities based on the n*t average probabilities and the t probability sets, to obtain the n*t standard probabilities.

Optionally, the function value determining submodule is specifically configured to:

select one sample image from the n sample images, select one to-be-trained neural network model from the t to-be-trained neural network models, and determine, by using the b to-be-trained neural network models and based on the following operations, an average probability, of the selected sample image, that the selected to-be-trained neural network model is used to process, until the n*t average probabilities are determined:

determining, by using each of the b to-be-trained neural network models, a probability, of the selected sample image, that the selected to-be-trained neural network model is used to process, to obtain b probabilities; and determining an average value of the b probabilities, to obtain the average probability, of the selected sample image, that the selected to-be-trained neural network model is used to process.

Optionally, the function value determining submodule is specifically configured to:

select a probability set from the t probability sets, and perform standardization processing on each average probability in the selected probability set based on the following operations, until the n*t standard probabilities are determined:

determining a mean value and a standard deviation of average probabilities in the selected probability set; and determining, based on the average probabilities in the selected probability set, the average value, and the standard deviation, a standard probability corresponding to each average probability in the selected probability set.

Optionally, the function value determining submodule is specifically configured to:

form a standard probability set by using the n*t standard probabilities, and determine a relative probability value corresponding to each standard probability in the standard probability set;

determine a largest relative probability value from relative probability values corresponding to the standard probabilities in the standard probability set;

determine, from the n sample images, a sample image corresponding to the largest relative probability value, and determine, from the t to-be-trained neural network models, a to-be-trained neural network model corresponding to the largest relative probability value;

determine, based on the to-be-trained neural network model corresponding to the largest relative probability value, a first weight of a sample image corresponding to the largest relative probability value;

remove, from the standard probability set, a standard probability corresponding to the sample image corresponding to the largest relative probability value;

if the standard probability set is not null after the removal, update a model determining quantity, where the model determining quantity is a quantity of times of determining, from the t to-be-trained neural network models, the to-be-trained neural network model corresponding to the largest relative probability value; and if the updated model determining quantity is greater than or equal to n/t, remove, from the standard probability set, a standard probability corresponding to the to-be-trained neural network model corresponding to the largest relative probability value, and return to the step of determining the relative probability value corresponding to each standard probability in the standard probability set.

Optionally, the function value determining submodule is specifically configured to:

if the to-be-trained neural network model corresponding to the largest relative probability value is the to-be-trained neural network model k, determine the first weight of the sample image corresponding to the largest relative probability value to be $$a + \frac{1-a}{t};$$

and if the to-be-trained neural network model corresponding to the largest relative probability value is not the to-be-trained neural network model k, determine the first weight of the sample image corresponding to the largest relative probability value to be $$\frac{1-a}{t}.$$

α is a set real number, and meets a≥0, and a≤1.

Optionally, the training function value includes n label function values, and the n label function values one-to-one correspond to the n sample images.

The function value determining submodule is specifically configured to:

determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images; and determine, based on the n*s standard probabilities, the label function value corresponding to each of the n sample images.

Optionally, the function value determining submodule is specifically configured to:

form a standard probability set by using the n*s standard probabilities, and determine a relative probability value corresponding to each standard probability in the standard probability set;

determine a largest relative probability value from relative probability values corresponding to the standard probabilities in the standard probability set;

determine, from the n sample images, a sample image corresponding to the largest relative probability value, and determine, from the s to-be-trained neural network models, a to-be-trained neural network model corresponding to the largest relative probability value;

determine, as a label function value of the sample image corresponding to the largest relative probability value, a location number of the to-be-trained neural network model that corresponds to the largest relative probability value and that is in the s to-be-trained neural network models;

remove, from the standard probability set, a standard probability corresponding to the sample image corresponding to the largest relative probability value;

if the standard probability set is not null after the removal, update a model determining quantity, where the model determining quantity is a quantity of times of determining, from the s to-be-trained neural network models, the to-be-trained neural network model corresponding to the largest relative probability value; and if the updated model determining quantity is greater than or equal to n/s, remove, from the standard probability set, a standard probability corresponding to the to-be-trained neural network model corresponding to the largest relative probability value, and return to the step of determining the relative probability value corresponding to each standard probability in the standard probability set.

Optionally, the function value determining submodule is specifically configured to:

select a standard probability from the standard probability set, and determine, based on the following operations, a relative probability value corresponding to the selected standard probability, until a relative probability value corresponding to each standard probability is determined:

determining, from other standard probabilities other than the selected standard probability in the standard probability set, a plurality of standard probabilities corresponding to a same sample image as the selected standard probability;

determining a largest standard probability in the plurality of standard probabilities; and determining a difference between the selected standard probability and the largest standard probability as the relative probability value corresponding to the selected standard probability.

Optionally, the training function value includes n classification loss function values, and the n classification loss function values one-to-one correspond to the n sample images.

The function value determining submodule is specifically configured to:

select one sample image from the n sample images, and determine, based on the following operations, a classification loss function value corresponding to the selected sample image, until a classification loss function value corresponding to each sample image is determined:

determining, by using the to-be-trained neural network model k, a probability, of the selected sample image, that each of the s to-be-trained neural network models is used to process, to obtain s probabilities; and determining, based on a label function value corresponding to the selected sample image and the s probabilities, the classification loss function value corresponding to the selected sample image.

Optionally, the training function value includes n model selection weight function values, and the n model selection weight function values one-to-one correspond to the n sample images.

The function value determining submodule is specifically configured to:

determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images; and determine the model selection weight function value corresponding to each of the n sample images based on the n*s standard probabilities.

Optionally, the function value determining submodule is specifically configured to:

determine, by using each of the s to-be-trained neural network models, a probability, of a corresponding sample label, to which each of the n sample images belongs, to obtain n*s probabilities;

divide probabilities that are in the n*s probabilities and that correspond to a same to-be-trained neural network model in the s to-be-trained neural network models into a probability set, to obtain s probability sets; and perform standardization processing on the n*s probabilities based on the n*s probabilities and the s probability sets, to obtain the n*s standard probabilities.

Optionally, the function value determining submodule is specifically configured to:

divide probabilities that are in the n*s standard probabilities and that correspond to a same sample image in the n sample images into one probability set, to obtain n probability sets;

determine a standard deviation of standard probabilities included in each of the n probability sets, to obtain n standard deviations; and perform normalization processing on each of the n standard deviations, to obtain the model selection weight function value corresponding to each of the n sample images.

In this embodiment of this application, after the target image is input into the current neural network model, the current neural network model can not only output the current classification result about the target image, but also determine a probability corresponding to a neural network model that is after the current neural network model and that is allowed to be used to process the target image. In addition, a large probability corresponding to the neural network model that is after the current neural network model and that is allowed to be used to process the target image indicates high classification precision of the neural network model for the target image. In addition, usually, classification precision of the neural network model corresponding to the largest probability for the target image is higher than classification precision of the current neural network model for the target image. Therefore, after cyclic iteration processing is performed in this manner, image classification precision can be improved. In other words, in this embodiment of this application, based on a property of the target image, a part of neural network models can be dynamically selected from the m neural network models to perform image classification, and image classification does not need to be performed on each neural network model, thereby reducing an operation amount. In addition, because only the part of neural network models are selected, only parameters of the part of neural network models need to be read into a memory, and parameters of all neural network models do not need to be read into the memory, thereby avoiding a problem of time-consuming memory reading.

It should be noted that when the image classification apparatus provided in the foregoing embodiment performs image classification, division of the foregoing function modules is merely used as an example for description. In actual application, the functions may be allocated to different function modules for implementation as required. To be specific, an internal structure of the apparatus is divided into different function modules to implement all or some of the functions described above. In addition, the image classification apparatus provided in the foregoing embodiment and the image classification method embodiments belong to a same concept. For a specific implementation process of the apparatus, refer to the method embodiments. Details are not described herein again.

Figure 15:
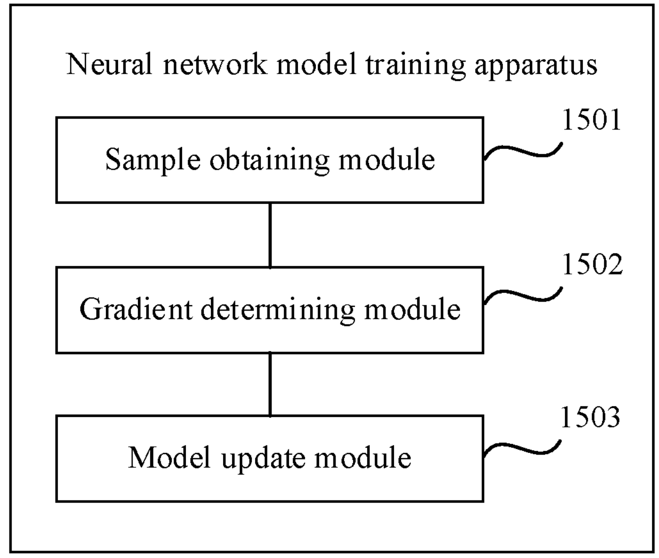
FIG. 15 is a schematic diagram of a structure of a neural network model training apparatus according to an embodiment of this application.

FIG. 15 is a schematic diagram of a structure of a neural network model training apparatus according to an embodiment of this application. The apparatus may be implemented by software, hardware, or a combination of software and hardware to become a part or an entirety of a computer device. The computer device may be the terminal or the server shown in FIG. 1. Refer to FIG. 15. The apparatus includes a sample obtaining module 1501, a gradient determining module 1502, and a model update module 1503.

The sample obtaining module 1501 is configured to obtain n sample images and n sample labels, where the n sample labels one-to-one correspond to the n sample images.

The gradient determining module 1502 is configured to determine, based on the n sample images and the n sample labels, a gradient of each parameter of each of m to-be-trained neural network models.

The model update module 1503 is configured to update the m to-be-trained neural network models based on the gradient of each parameter of the m to-be-trained neural network models, to obtain m trained neural network models.

Optionally, the gradient determining module 1502 includes:

determining a gradient of each parameter of a to-be-trained neural network model k in the m to-be-trained neural network models based on the following modules, until the gradient of each parameter of each to-be-trained neural network model is determined:

a function value determining submodule, configured to determine, based on the n sample images and the n sample labels, a training function value corresponding to the to-be-trained neural network model k; and a gradient determining submodule, configured to determine the gradient of each parameter of the to-be-trained neural network model k based on the training function value corresponding to the to-be-trained neural network model k.

Optionally, the training function value includes n classification function values, and the n classification function values one-to-one correspond to the n sample images.

The function value determining submodule is specifically configured to:

select one sample image from the n sample images, and determine, based on the following operations, a classification function value corresponding to the selected sample image, until a classification function value corresponding to each sample image is determined:

inputting the selected sample image into the to-be-trained neural network model k, to obtain a classification result output by the to-be-trained neural network model k; and determining, based on a sample label corresponding to the selected sample image and the classification result output by the to-be-trained neural network model k, the classification function value corresponding to the selected sample image.

Optionally, the training function value includes n weight function values, and the n weight function values one-to-one correspond to the n sample images.

The function value determining submodule is specifically configured to:

determine, by using b to-be-trained neural network models, a standard probability, of each of the n sample images, that each oft to-be-trained neural network models is used to process, to obtain n*t standard probabilities, where t=m−b, the b to-be-trained neural network models are models, in the m to-be-trained neural network models, that are before the to-be-trained neural network model k and that are allowed to be used to process the n sample images, and the t to-be-trained neural network models include the to-be-trained neural network model k, and the model, in the m to-be-trained neural network models, that is after the to-be-trained neural network model k and that is allowed to be used to process the n sample images;

determine, based on the n*t standard probabilities, a first weight corresponding to each of the n sample images; and perform normalization processing on the first weight corresponding to each of the n sample images, to obtain the weight function value corresponding to each of the n sample images.

Optionally, the function value determining submodule is specifically configured to:

determine, by using the b to-be-trained neural network models, an average probability, of each of the n sample images, that each of the t to-be-trained neural network models is used to process, to obtain n*t average probabilities;

divide average probabilities that are in the n*t average probabilities and that correspond to a same to-be-trained neural network model in the t to-be-trained neural network models into a probability set, to obtain t probability sets; and perform standardization processing on the n*t average probabilities based on the n*t average probabilities and the t probability sets, to obtain the n*t standard probabilities.

Optionally, the function value determining submodule is specifically configured to:

select one sample image from the n sample images, select one to-be-trained neural network model from the t to-be-trained neural network models, and determine, by using the b to-be-trained neural network models and based on the following operations, an average probability, of the selected sample image, that the selected to-be-trained neural network model is used to process, until the n*t average probabilities are determined:

determining, by using each of the b to-be-trained neural network models, a probability, of the selected sample image, that the selected to-be-trained neural network model is used to process, to obtain b probabilities; and determining an average value of the b probabilities, to obtain the average probability, of the selected sample image, that the selected to-be-trained neural network model is used to process.

Optionally, the function value determining submodule is specifically configured to:

select a probability set from the t probability sets, and perform standardization processing on each average probability in the selected probability set based on the following operations, until the n*t standard probabilities are determined:

determining a mean value and a standard deviation of average probabilities in the selected probability set; and determining, based on the average probabilities in the selected probability set, the average value, and the standard deviation, a standard probability corresponding to each average probability in the selected probability set.

Optionally, the function value determining submodule is specifically configured to:

form a standard probability set by using the n*t standard probabilities, and determine a relative probability value corresponding to each standard probability in the standard probability set;

determine a largest relative probability value from relative probability values corresponding to the standard probabilities in the standard probability set;

determine, from the n sample images, a sample image corresponding to the largest relative probability value, and determine, from the t to-be-trained neural network models, a to-be-trained neural network model corresponding to the largest relative probability value;

determine, based on the to-be-trained neural network model corresponding to the largest relative probability value, a first weight of a sample image corresponding to the largest relative probability value;

remove, from the standard probability set, a standard probability corresponding to the sample image corresponding to the largest relative probability value;

if the standard probability set is not null after the removal, update a model determining quantity, where the model determining quantity is a quantity of times of determining, from the t to-be-trained neural network models, the to-be-trained neural network model corresponding to the largest relative probability value; and if the updated model determining quantity is greater than or equal to n/t, remove, from the standard probability set, a standard probability corresponding to the to-be-trained neural network model corresponding to the largest relative probability value, and return to the step of determining the relative probability value corresponding to each standard probability in the standard probability set.

Optionally, the function value determining submodule is specifically configured to:

if the to-be-trained neural network model corresponding to the largest relative probability value is the to-be-trained neural network model k, determine the first weight of the sample image corresponding to the largest relative probability value to be $$a+\frac{1-a}{t};$$

and if the to-be-trained neural network model corresponding to the largest relative probability value is not the to-be-trained neural network model k, determine the first weight of the sample image corresponding to the largest relative probability value to be $$\frac{1-a}{t}.$$

α is a set real number, and meets a≥0, and a≤1.

Optionally, the training function value includes n label function values, and the n label function values one-to-one correspond to the n sample images.

The function value determining submodule is specifically configured to:

determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images; and determine, based on the n*s standard probabilities, the label function value corresponding to each of the n sample images.

Optionally, the function value determining submodule is specifically configured to:

form a standard probability set by using the n*s standard probabilities, and determine a relative probability value corresponding to each standard probability in the standard probability set;

determine a largest relative probability value from relative probability values corresponding to the standard probabilities in the standard probability set;

determine, from the n sample images, a sample image corresponding to the largest relative probability value, and determine, from the s to-be-trained neural network models, a to-be-trained neural network model corresponding to the largest relative probability value;

determine, as a label function value of the sample image corresponding to the largest relative probability value, a location number of the to-be-trained neural network model that corresponds to the largest relative probability value and that is in the s to-be-trained neural network models;

remove, from the standard probability set, a standard probability corresponding to the sample image corresponding to the largest relative probability value;

if the standard probability set is not null after the removal, update a model determining quantity, where the model determining quantity is a quantity of times of determining, from the s to-be-trained neural network models, the to-be-trained neural network model corresponding to the largest relative probability value; and if the updated model determining quantity is greater than or equal to n/s, remove, from the standard probability set, a standard probability corresponding to the to-be-trained neural network model corresponding to the largest relative probability value, and return to the step of determining the relative probability value corresponding to each standard probability in the standard probability set.

Optionally, the function value determining submodule is specifically configured to:

select a standard probability from the standard probability set, and determine, based on the following operations, a relative probability value corresponding to the selected standard probability, until a relative probability value corresponding to each standard probability is determined:

determining, from other standard probabilities other than the selected standard probability in the standard probability set, a plurality of standard probabilities corresponding to a same sample image as the selected standard probability;

determining a largest standard probability in the plurality of standard probabilities; and determining a difference between the selected standard probability and the largest standard probability as the relative probability value corresponding to the selected standard probability.

Optionally, the training function value includes n classification loss function values, and the n classification loss function values one-to-one correspond to the n sample images.

The function value determining submodule is specifically configured to:

select one sample image from the n sample images, and determine, based on the following operations, a classification loss function value corresponding to the selected sample image, until a classification loss function value corresponding to each sample image is determined:

determining, by using the to-be-trained neural network model k, a probability, of the selected sample image, that each of the s to-be-trained neural network models is used to process, to obtain s probabilities; and determining, based on a label function value corresponding to the selected sample image and the s probabilities, the classification loss function value corresponding to the selected sample image.

Optionally, the training function value includes n model selection weight function values, and the n model selection weight function values one-to-one correspond to the n sample images.

The function value determining submodule is specifically configured to:

- determine, by using each of s to-be-trained neural network models, a standard probability, of a corresponding sample label, to which each of the n sample images belongs, to obtain n*s standard probabilities, where the s to-be-trained neural network models are models, in the m to-be-trained neural network models, that are after the to-be-trained neural network model k and that are allowed to be used to process the n sample images; and
- determine the model selection weight function value corresponding to each of the n sample images based on the n*s standard probabilities.

Optionally, the function value determining submodule is specifically configured to:

- determine, by using each of the s to-be-trained neural network models, a probability, of a corresponding sample label, to which each of the n sample images belongs, to obtain n*s probabilities;
- divide probabilities that are in the n*s probabilities and that correspond to a same to-be-trained neural network model in the s to-be-trained neural network models into a probability set, to obtain s probability sets; and
- perform standardization processing on the n*s probabilities based on the n*s probabilities and the s probability sets, to obtain the n*s standard probabilities.

Optionally, the function value determining submodule is specifically configured to:

- divide probabilities that are in the n*s standard probabilities and that correspond to a same sample image in the n sample images into one probability set, to obtain n probability sets;
- determine a standard deviation of standard probabilities included in each of the n probability sets, to obtain n standard deviations; and
- perform normalization processing on each of the n standard deviations, to obtain the model selection weight function value corresponding to each of the n sample images.

In this embodiment of this application, after the target image is input into the current neural network model, the current neural network model can not only output the current classification result about the target image, but also determine a probability corresponding to a neural network model that is after the current neural network model and that is allowed to be used to process the target image. In addition, a large probability corresponding to the neural network model that is after the current neural network model and that is allowed to be used to process the target image indicates high classification precision of the neural network model for the target image. In addition, usually, classification precision of the neural network model corresponding to the largest probability for the target image is higher than classification precision of the current neural network model for the target image. Therefore, after cyclic iteration processing is performed in this manner, image classification precision can be improved. In other words, in this embodiment of this application, based on a property of the target image, a part of neural network models can be dynamically selected from the m neural network models to perform image classification, and image classification does not need to be performed on each neural network model, thereby reducing an operation amount. In addition, because only the part of neural network models are selected, only parameters of the part of neural network models need to be read into a memory, and parameters of all neural network models do not need to be read into the memory, thereby avoiding a problem of time-consuming memory reading.

It should be noted that when the image classification apparatus provided in the foregoing embodiment performs image classification, division of the foregoing function modules is merely used as an example for description. In actual application, the functions may be allocated to different function modules for implementation as required. To be specific, an internal structure of the apparatus is divided into different function modules to implement all or some of the functions described above. In addition, the image classification apparatus provided in the foregoing embodiment and the image classification method embodiments belong to a same concept. For a specific implementation process of the apparatus, refer to the method embodiments. Details are not described herein again.

All or a part of the foregoing embodiments may be implemented by software, hardware, firmware, or any combination thereof. When the software is used to implement embodiments, all or a part of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like. It should be noted that, the computer-readable storage medium mentioned in this embodiment of this application may be a non-volatile storage medium, or in other words, may be a non-transitory storage medium.

It should be understood that "a plurality of" in this specification means two or more. In the descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A device, wherein the device comprises:

one or more processors; and a memory coupled to the one or more processors, wherein the memory stores instructions, and when the instructions are executed by the device, the device is enabled to perform operations including:

processing a target image by using a current neural network model, to obtain a current classification result output by the current neural network model, wherein the current classification result comprises a probability that the target image belongs to each of a plurality of categories, the current neural network model is a neural network model i corresponding to a largest probability in a selection result output by a neural network model a, the selection result comprises probabilities corresponding to p neural network models in m trained neural network models, the p neural network models are after the neural network model a and are allowed to be used to process the target image, the p neural network models comprise the neural network model i, the m trained neural network models comprise the neural network model a, m is an integer greater than 1, p is an integer greater than or equal to 1, and p is less than m;

determining a current integration result based on the current classification result, wherein the current integration result comprises an integrated probability that the target image belongs to each of the plurality of categories; and determining a category of the target image based on the current integration result, the determining the category of the target image comprising:

(i) determining a category corresponding to a largest probability in the current integration result as the category of the target image; or (ii) based on that the current integration result meets a first convergence condition or the current neural network model meets a second convergence condition, determining the category corresponding to the largest probability in the current integration result as the category of the target image.

2. The device according to claim 1, wherein a probability of a first category in the current integration result comprises an average value of probabilities of the first category in a plurality of classification results, wherein the first category is one of the plurality of categories, and the plurality of classification results comprise a classification result output by the neural network model a and a classification result output by the neural network model i; or wherein the probability of the first category in the current integration result comprises a first probability of the first category in the classification result output by the neural network model i.

3. The device according to claim 1, wherein the current neural network model further outputs a current selection result, the current selection result comprises probabilities corresponding to d neural network models in the m trained neural network models, the d neural network models are after the neural network model i and are allowed to be used to process the target image, d is an integer greater than or equal to 1, and d is less than m.

4. The device according to claim 1, wherein the current integration result meeting the first convergence condition comprises: confidence of the current integration result being greater than a confidence threshold.

5. The device according to claim 4, wherein the operations further comprise:

determining the largest probability in the current integration result as the confidence of the current integration result; or inputting the target image and the current integration result into a confidence network model, to obtain the confidence that is output by the confidence network model and that is of the current integration result.

6. The device according to claim 1, wherein the current neural network model meeting the second convergence condition comprises: an iteration quantity of the current neural network model being greater than or equal to an iteration quantity threshold.

7. The device according to claim 1, wherein the operations further comprise:

obtaining n sample images and n sample labels, wherein the n sample labels one-to-one correspond to the n sample images;

determining, based on the n sample images and the n sample labels, a gradient of each parameter of each of m to-be-trained neural network models; and updating the m to-be-trained neural network models based on the gradient of each parameter of the m to-be-trained neural network models, to obtain the m trained neural network models.

8. The device according to claim 7, wherein the determining, based on the n sample images and the n sample labels, the gradient of each parameter of each of the m to-be-trained neural network models comprises:

determining a corresponding gradient of each parameter of a to-be-trained neural network model k in the m to-be-trained neural network models based on first following operations, until the corresponding gradient of each parameter of each to-be-trained neural network model k is determined, the first following operations including:

determining, based on the n sample images and the n sample labels, a training function value corresponding to the to-be-trained neural network model k; and determining the corresponding gradient of each parameter of the to-be-trained neural network model k based on the training function value corresponding to the to-be-trained neural network model k.

9. The device according to claim 8, wherein the training function value comprises n classification function values, and the n classification function values one-to-one correspond to the n sample images; and the determining, based on the n sample images and the n sample labels, the training function value corresponding to the to-be-trained neural network model k comprises:

selecting a sample image from the n sample images, and determining, based on second following operations, a classification function value corresponding to the selected sample image, until a corresponding classification function value corresponding to each sample image is determined, the second following operations including:

inputting the selected sample image into the to-be-trained neural network model k, to obtain a classification result output by the to-be-trained neural network model k; and determining, based on a sample label corresponding to the selected sample image and the classification result output by the to-be-trained neural network model k, the classification function value corresponding to the selected sample image.

10. The device according to claim 8, wherein the training function value comprises n weight function values, and the n weight function values one-to-one correspond to the n sample images; and the determining, based on the n sample images and the n sample labels, the training function value corresponding to the to-be-trained neural network model k comprises determining, by using b to-be-trained neural network models, a standard probability, of each of the n sample images, that each of t to-be-trained neural network models is used to process, to obtain n*t standard probabilities, wherein t=m−b, the b to-be-trained neural network models are models, in the m to-be-trained neural network models, that are before the to-be-trained neural network model k and that are allowed to be used to process the n sample images, and the t to-be-trained neural network models comprise the to-be-trained neural network model k, and a model, in the m to-be-trained neural network models, that is after the to-be-trained neural network model k and that is allowed to be used to process the n sample images;

determining, based on the n*t standard probabilities, a first weight corresponding to each of the n sample images; and performing normalization processing on the first weight corresponding to each of the n sample images, to obtain a weight function value corresponding to each of the n sample images.

11. The device according to claim 10, wherein the determining, by using the b to-be-trained neural network models, the standard probability, of each of the n sample images, that each of the t to-be-trained neural network models is used to process, to obtain the n*t standard probabilities comprises:

determining, by using the b to-be-trained neural network models, an average probability, of each of the n sample images, that each of the t to-be-trained neural network models is used to process, to obtain n*t average probabilities;

dividing average probabilities that are in the n*t average probabilities and that correspond to a same to-be-trained neural network model in the t to-be-trained neural network models into a probability set, to obtain t probability sets; and performing standardization processing on the n*t average probabilities based on the n*t average probabilities and the t probability sets, to obtain the n*t standard probabilities.

12. The device according to claim 10, wherein the determining, based on the n*t standard probabilities, the first weight corresponding to each of the n sample images comprises:

forming a standard probability set by using the n*t standard probabilities, and determining a relative probability value corresponding to each standard probability in the standard probability set;

determining a largest relative probability value from relative probability values corresponding to standard probabilities in the standard probability set;

determining, from the n sample images, a sample image corresponding to the largest relative probability value, and determining, from the t to-be-trained neural network models, a to-be-trained neural network model corresponding to the largest relative probability value;

determining, based on the to-be-trained neural network model corresponding to the largest relative probability value, a first weight of the sample image corresponding to the largest relative probability value;

removing, from the standard probability set, a standard probability corresponding to the sample image corresponding to the largest relative probability value;

based on that the standard probability set is not null after the removal, updating a model determining quantity, wherein the model determining quantity is a quantity of times of determining, from the t to-be-trained neural network models, the to-be-trained neural network model corresponding to the largest relative probability value; and based on that the model determining quantity is greater than or equal to n/t, removing, from the standard probability set, a standard probability corresponding to the to-be-trained neural network model corresponding to the largest relative probability value, and returning to the step of determining the relative probability value corresponding to each standard probability in the standard probability set.

13. The device according to claim 8, wherein the training function value comprises n label function values, and the n label function values one-to-one correspond to the n sample images; and the determining, based on the n sample images and the n sample labels, the training function value corresponding to the to-be-trained neural network model k comprises:

determining, by using each of s to-be-trained neural network models, a standard probability, of a corresponding sample label, to which each of the n sample images belongs, to obtain n*s standard probabilities, wherein the s to-be-trained neural network models are models, in the m to-be-trained neural network models, that are after the to-be-trained neural network model k and that are allowed to be used to process the n sample images; and determining, based on the n*s standard probabilities, a label function value corresponding to each of the n sample images.

14. The device according to claim 13, wherein the determining, based on the n*s standard probabilities, the label function value corresponding to each of the n sample images comprises:

forming a standard probability set by using the n*s standard probabilities, and determining a relative probability value corresponding to each standard probability in the standard probability set;

determining a largest relative probability value from relative probability values corresponding to standard probabilities in the standard probability set;

determining, from the n sample images, a sample image corresponding to the largest relative probability value, and determining, from the s to-be-trained neural network models, a to-be-trained neural network model corresponding to the largest relative probability value;

determining, as a label function value of the sample image corresponding to the largest relative probability value, a location number of the to-be-trained neural network model that corresponds to the largest relative probability value and that is in the s to-be-trained neural network models;

removing, from the standard probability set, a standard probability corresponding to the sample image corresponding to the largest relative probability value;

based on that the standard probability set is not null after the removal, updating a model determining quantity, wherein the model determining quantity is a quantity of times of determining, from the s to-be-trained neural network models, the to-be-trained neural network model corresponding to the largest relative probability value; and based on that the model determining quantity is greater than or equal to n/s, removing, from the standard probability set, a standard probability corresponding to the to-be-trained neural network model corresponding to the largest relative probability value, and returning to the determining the relative probability value corresponding to each standard probability in the standard probability set.

15. The device according to claim 13, wherein the training function value comprises n classification loss function values, and the n classification loss function values one-to-one correspond to the n sample images; and the determining, based on the n sample images and the n sample labels, the training function value corresponding to the to-be-trained neural network model k comprises:

selecting a sample image from the n sample images, and determining, based on third following operations, a classification loss function value corresponding to the selected sample image, until a respective classification loss function value corresponding to each sample image is determined, the third following operations including:

determining, by using the to-be-trained neural network model k, a probability, of the selected sample image, that each of the s to-be-trained neural network models is used to process, to obtain s probabilities; and determining, based on a label function value corresponding to the selected sample image and the s probabilities, the classification loss function value corresponding to the selected sample image.

16. The device according to claim 8, wherein the training function value comprises n model selection weight function values, and the n model selection weight function values one-to-one correspond to the n sample images; and the determining, based on the n sample images and the n sample labels, the training function value corresponding to the to-be-trained neural network model k comprises:

determining, by using each of s to-be-trained neural network models, a standard probability, of a corresponding sample label, to which each of the n sample images belongs, to obtain n*s standard probabilities, wherein the s to-be-trained neural network models are models, in the m to-be-trained neural network models, that are after the to-be-trained neural network model k and that are allowed to be used to process the n sample images; and determining, based on the n*s standard probabilities, a model selection weight function value corresponding to each of the n sample images.

17. A method, wherein the method comprises:

processing a target image by using a current neural network model, to obtain a current classification result output by the current neural network model, wherein the current classification result comprises a probability that the target image belongs to each of a plurality of categories, the current neural network model is a neural network model i corresponding to a largest probability in a selection result output by a neural network model a, the selection result comprises probabilities corresponding to p neural network models in m trained neural network models, the p neural network models are after the neural network model a and are allowed to be used to process the target image, the p neural network models comprise the neural network model i, the m trained neural network models comprise the neural network model a, m is an integer greater than 1, p is an integer greater than or equal to 1, and p is less than m;

determining a current integration result based on the current classification result, wherein the current integration result comprises an integrated probability that the target image belongs to each of the plurality of categories; and determining a category of the target image based on the current integration result, the determining the category of the target image comprising:

(i) determining a category corresponding to a largest probability in the current integration result as the category of the target image; or (ii) based on that the current integration result meets a first convergence condition or the current neural network model meets a second convergence condition, determining the category corresponding to the largest probability in the current integration result as the category of the target image.

18. The method according to claim 17, wherein a probability of a first category in the current integration result comprises an average value of probabilities of the first category in a plurality of classification results, wherein the first category is one of the plurality of categories, and the plurality of classification results comprise a classification result output by the neural network model a and a classification result output by the neural network model i; or wherein the probability of the first category in the current integration result comprises a probability of the first category in the classification result output by the neural network model i.

19. The method according to claim 17, wherein the current neural network model further outputs a current selection result, the current selection result comprises probabilities corresponding to d neural network models in the m trained neural network models, the d neural network models are after the neural network model i and are allowed to be used to process the target image, d is an integer greater than or equal to 1, and d is less than m.

20. A non-transitory computer-readable storage medium, wherein the non-transitory computer-readable storage medium stores instructions, and when the instructions are executed by a computer device, the computer device is enabled to perform operations including:

processing a target image by using a current neural network model, to obtain a current classification result output by the current neural network model, wherein the current classification result comprises a probability that the target image belongs to each of a plurality of categories, the current neural network model is a neural network model i corresponding to a largest probability in a selection result output by a neural network model a, the selection result comprises probabilities corresponding to p neural network models in m trained neural network models, the p neural network models are after the neural network model a and are allowed to be used to process the target image, the p neural network models comprise the neural network model i, the m trained neural network models comprise the neural network model a, m is an integer greater than 1, p is an integer greater than or equal to 1, and p is less than m;

determining a current integration result based on the current classification result, wherein the current integration result comprises an integrated probability that the target image belongs to each of the plurality of categories; and determining a category of the target image based on the current integration result, the determining the category of the target image comprising:

(i) determining a category corresponding to a largest probability in the current integration result as the category of the target image; or (ii) based on that the current integration result meets a first convergence condition or the current neural network model meets a second convergence condition, determining the category corresponding to the largest probability in the current integration result as the category of the target image.

* * * * *